(12) United States Patent
Dutta et al.

(10) Patent No.: US 11,888,505 B2
(45) Date of Patent: Jan. 30, 2024

(54) RECONFIGURABLE INTELLIGENT SURFACE-BASED INTERFERENCE CANCELLATION

(71) Applicant: QUALCOMM Incorporated, San Diego, CA (US)

(72) Inventors: Sourjya Dutta, San Diego, CA (US); Shuanshuan Wu, San Diego, CA (US); Kapil Gulati, Belle Mead, NJ (US); Junyi Li, Fairless Hills, PA (US); Navid Abedini, Basking Ridge, NJ (US); Anantharaman Balasubramanian, San Diego, CA (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/644,279

(22) Filed: Dec. 14, 2021

(65) Prior Publication Data
US 2023/0188170 A1   Jun. 15, 2023

(51) Int. Cl.
*H04B 1/10* (2006.01)
*H04W 24/08* (2009.01)

(52) U.S. Cl.
CPC .............. *H04B 1/10* (2013.01); *H04W 24/08* (2013.01)

(58) Field of Classification Search
CPC ................................. H04B 1/10; H04W 24/08
USPC ......................................................... 375/346
See application file for complete search history.

(56) References Cited

U.S. PATENT DOCUMENTS

| 2016/0014791 | A1* | 1/2016 | Liu ........................ | H04W 24/08 370/252 |
| 2017/0187448 | A1* | 6/2017 | Kwon ................ | H04B 7/15585 |

* cited by examiner

*Primary Examiner* — Leila Malek
(74) *Attorney, Agent, or Firm* — Patterson & Sheridan LLP

(57) ABSTRACT

Certain aspects of the present disclosure provide techniques for reconfigurable intelligent surface-based interference cancellation. A method that may be performed by a network entity generally includes determining to perform interference cancellation with a reconfigurable intelligent surface (RIS) for interference that will occur at a first wireless node based at least in part on one or more criteria, wherein the interference includes an interfering signal that will be transmitted by a second wireless node; and performing the interference cancellation with reflections from the RIS in response to the determination.

17 Claims, 13 Drawing Sheets

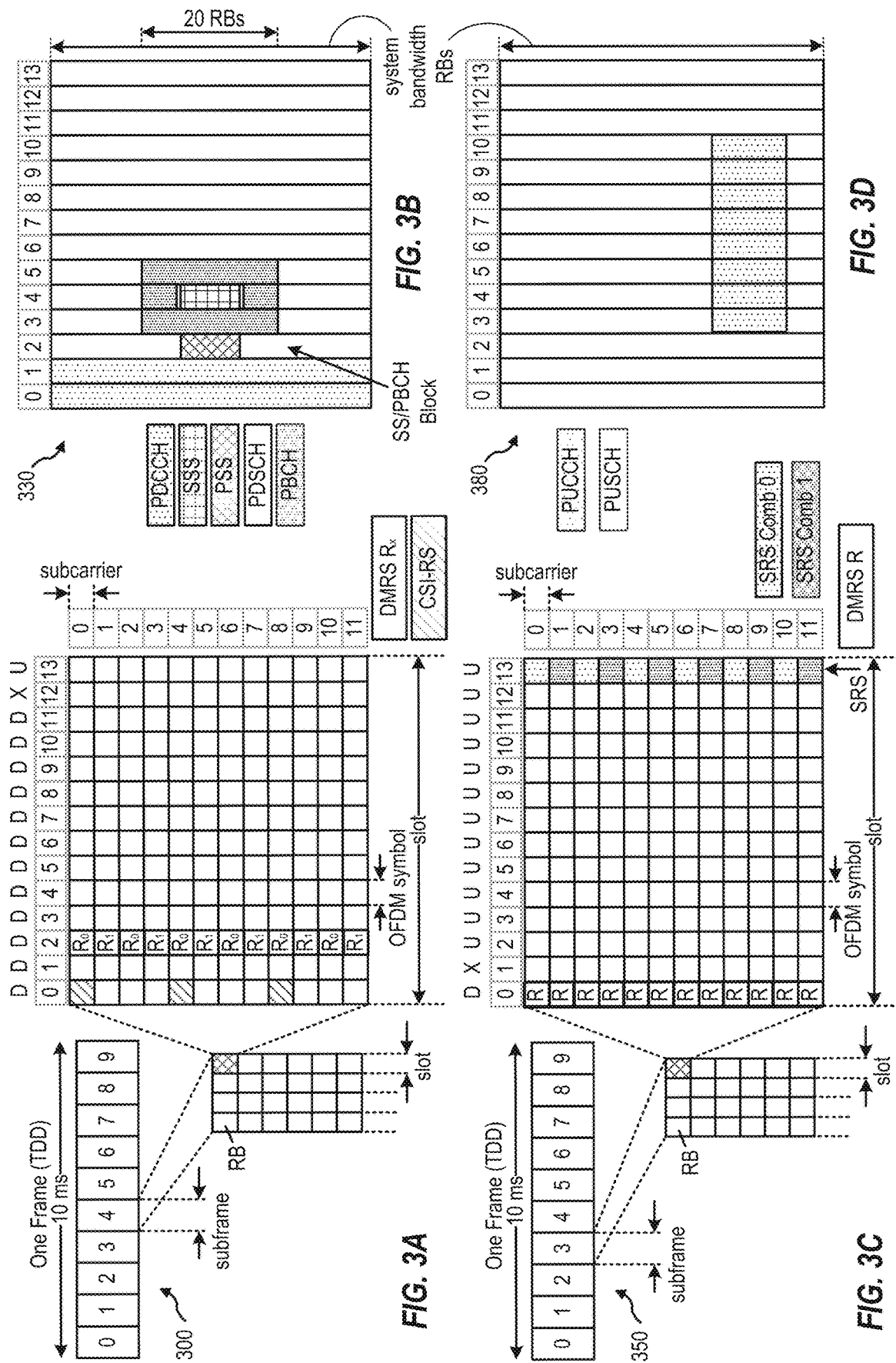

RECONFIGURABLE INTELLIGENT SURFACE-BASED INTERFERENCE CANCELLATION

BACKGROUND

Aspects of the present disclosure relate to wireless communications, and more particularly, to techniques for reconfigurable intelligent surface-based interference cancellation.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include desirable wireless communication performance, especially in sidelink communication environments.

Certain aspects of the subject matter described in this disclosure can be implemented in a method for wireless communication by a network entity. The method generally includes determining to perform interference cancellation with a reconfigurable intelligent surface (RIS) for interference that will occur at a first wireless node based at least in part on one or more criteria, wherein the interference includes an interfering signal that will be transmitted by a second wireless node; and performing the interference cancellation with reflections from the RIS in response to the determination.

Certain aspects of the subject matter described in this disclosure can be implemented in a method for wireless communication by a first wireless node. The method generally includes receiving, from a network entity, a notification that a reconfigurable intelligent surface (RIS) will perform interference cancellation for interference that will occur at at least one of the first wireless node or a second wireless node; and transmitting a report including information related to the interference cancellation in response to at least the notification.

Certain aspects of the subject matter described in this disclosure can be implemented in a network entity for wireless communication. The network entity generally includes a memory and a processor coupled to the memory. The processor and the memory are configured to determine to perform interference cancellation with a reconfigurable intelligent surface (RIS) for interference that will occur at a first wireless node based at least in part on one or more criteria, wherein the interference includes an interfering signal that will be transmitted by a second wireless node, and perform the interference cancellation with reflections from the RIS in response to the determination.

Certain aspects of the subject matter described in this disclosure can be implemented in an apparatus for wireless communication. The apparatus generally includes a memory and a processor coupled to the memory. The processor and the memory are configured to receive, from a network entity, a notification that a reconfigurable intelligent surface (RIS) will perform interference cancellation for interference that will occur at at least one of the apparatus or a wireless node, and transmit a report including information related to the interference cancellation in response to at least the notification.

Certain aspects of the subject matter described in this disclosure can be implemented in an apparatus for wireless communication. The apparatus generally includes means for determining to perform interference cancellation with a reconfigurable intelligent surface (RIS) for interference that will occur at a first wireless node based at least in part on one or more criteria, wherein the interference includes an interfering signal that will be transmitted by a second wireless node; and means for performing the interference cancellation via the RIS in response to the determination.

Certain aspects of the subject matter described in this disclosure can be implemented in an apparatus for wireless communication. The apparatus generally includes receiving, from a network entity, a notification that a reconfigurable intelligent surface (RIS) will perform interference cancellation for interference that will occur at at least one of the apparatus or a second wireless node; and transmitting a report including information related to the interference cancellation in response to at least the notification.

Certain aspects of the subject matter described in this disclosure can be implemented in a computer-readable medium. The computer-readable medium has instructions stored thereon for determining to perform interference cancellation with a reconfigurable intelligent surface (RIS) for interference that will occur at a first wireless node based at least in part on one or more criteria, wherein the interference includes an interfering signal will be transmitted by a second wireless node; and performing the interference cancellation with reflections from the RIS in response to the determination.

Certain aspects of the subject matter described in this disclosure can be implemented in a computer-readable medium. The computer-readable medium has instructions stored thereon for receiving, from a network entity, a notification that a reconfigurable intelligent surface (RIS) will perform interference cancellation for interference that will occur at at least one of the apparatus or a second wireless node; and transmitting a report including information related to the interference cancellation in response to at least the notification.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for reconfigurable intelligent surface (RIS)-based interference cancellation.

In certain cases, a wireless node may encounter interference from other wireless nodes, for example, especially in vehicle-to-everything (V2X) and/or vehicle-to-vehicle (V2V) systems. In a distributed system (e.g., V2X systems), collisions among transmissions are more likely to occur, which can affect weaker links between wireless nodes.

A RIS may be used to enhance the signal quality of links. Aspects of the present disclosure provide techniques and apparatus for RIS-based interference cancellation, for example, in sidelink communications. For distributed sidelink communications, interference may degrade system performance. A RIS may be used to reduce or cancel the interference encountered by certain wireless nodes (e.g., UEs), for example, due to colliding sidelink transmissions. In certain cases, a network entity may autonomously detect interference in a wireless network and determine to perform interference cancellation with a RIS. The network entity may use sensing information measured at the network entity and/or additional information from other wireless nodes to determine whether to perform the interference cancellation. In certain cases, the RIS-based interference cancellation may be triggered based on request(s) from wireless nodes in the network, such as wireless nodes experiencing interference or wireless nodes that will cause interference.

The RIS-based interference cancellation described herein may provide desirable sidelink performance, such as reduced latencies and/or higher data rates. For example, the RIS-based interference cancellation described herein may be used to destructively interfere with interfering transmissions encountered at certain wireless nodes.

Introduction to Wireless Communication Networks

Figure 1:
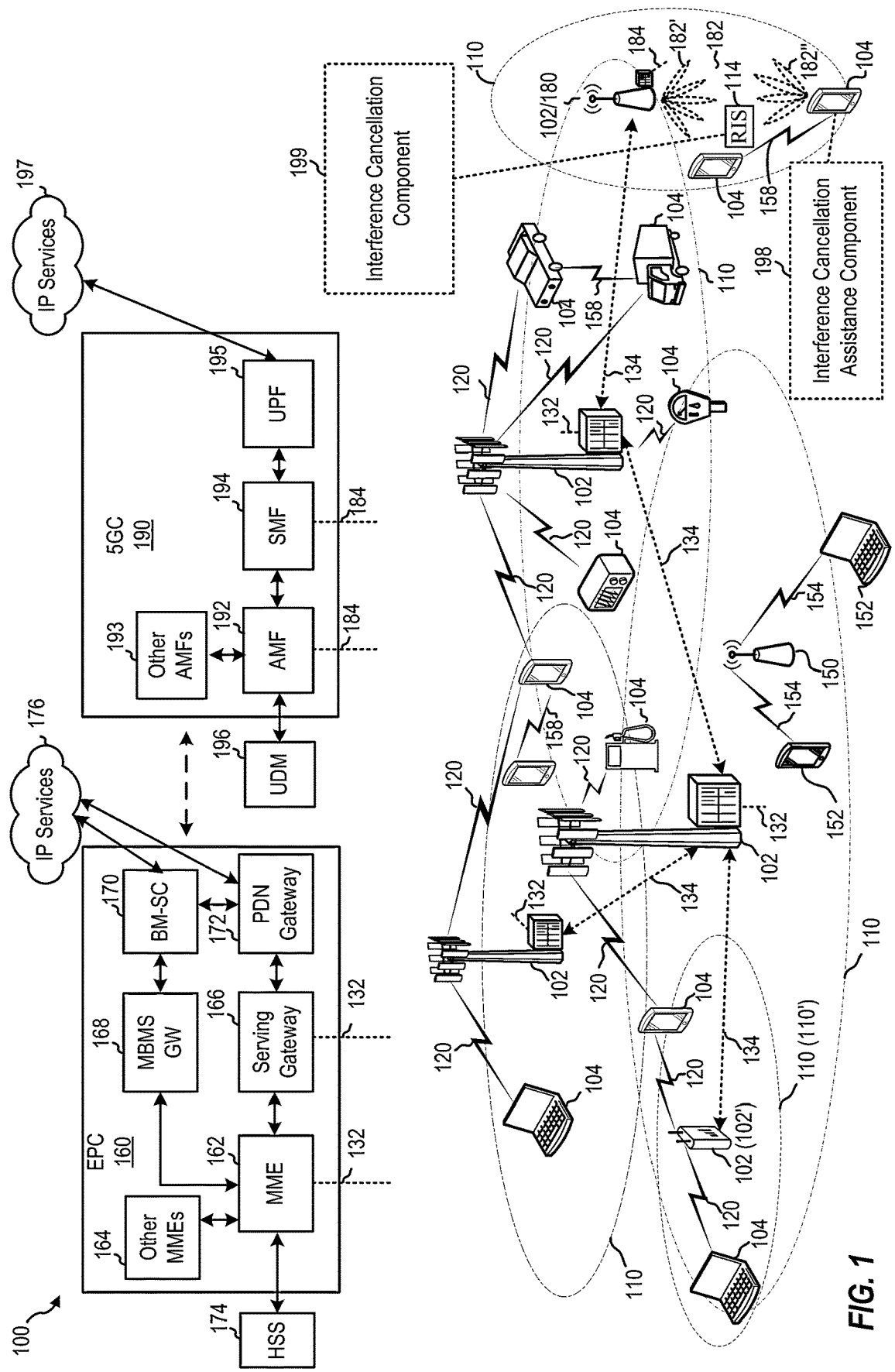
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beam-formed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

In certain aspects, the BS 102 and UE 104 may communicate through a reconfigurable intelligent surface (RIS) 114, for example, when a line-of-sight path between the BS 102 and the UE 104 is obstructed by an obstacle or when the channel capacity or channel quality in the line-of-sight path is relatively low. In certain cases, multiple UEs 104 may communicate with each other through the RIS 114. The RIS 114 may serve as a reflector for wireless communications. The RIS 114 may use a codebook for precoding one or more elements (e.g., antenna elements) thereon (referred to as RIS elements) to allow a beam from the BS 102 (e.g., a transmitter) to be re-radiated off the RIS 114 to reach the UE 104 (e.g., a receiver), or vice versa. A RIS controller (as further described herein with respect to FIG. 2) may control or reconfigure the spatial direction of the re-radiation (e.g., the beamforming) at the RIS 114. The term "reconfigurable intelligent surface" can refer to an intelligent reflecting surface, meta-surface, etc.

Wireless communication network 100 includes an interference cancellation component 199, which may be configured to perform interference cancellation via reflections from the RIS 114 for interference that will occur at a wireless node based at least in part on one or more criteria, as further described herein. Wireless network 100 further includes an interference cancellation assistance component 198, which may be used configured to provide report(s) with information related to the interference cancellation.

Figure 2:
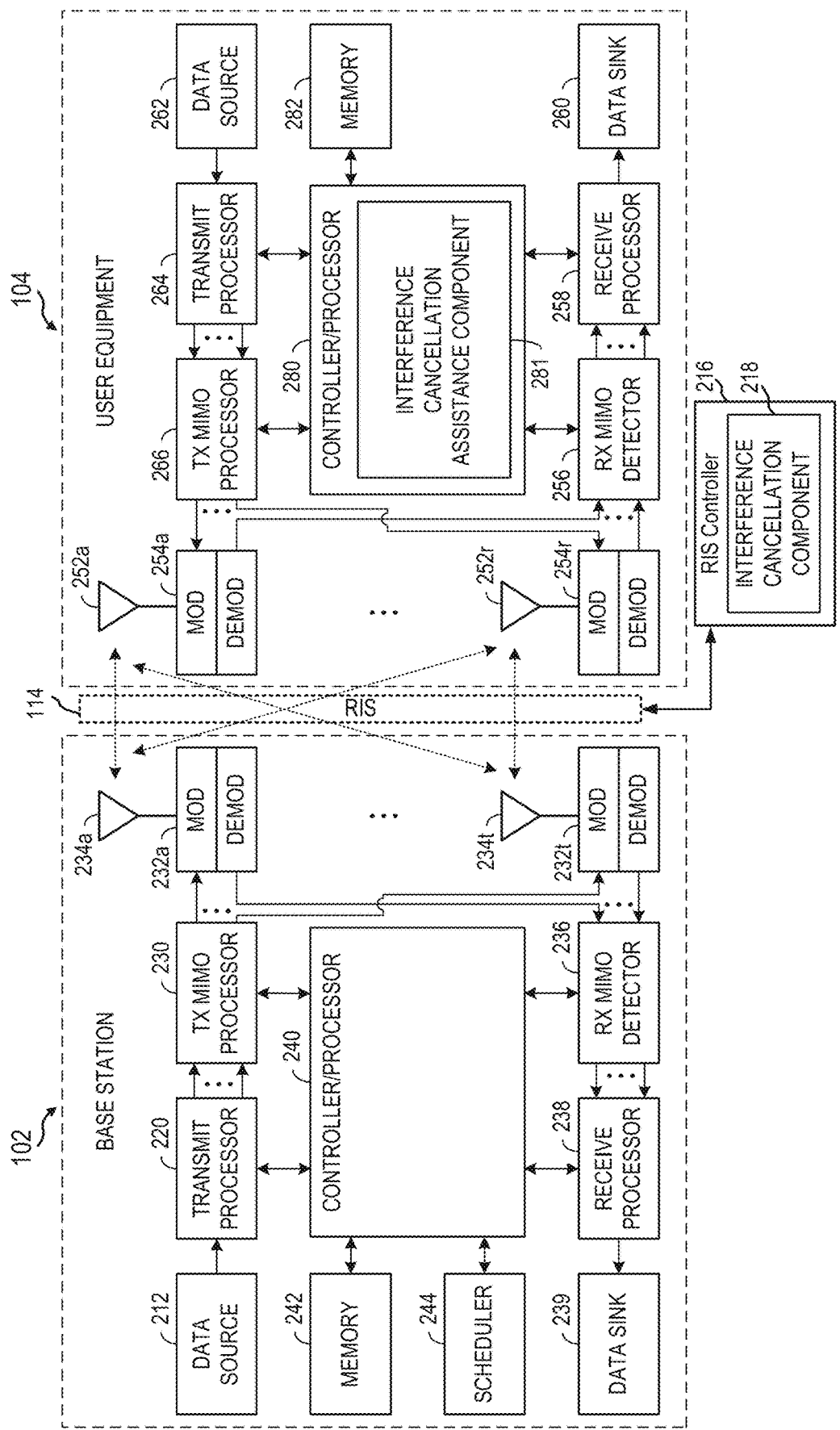
FIG. 2 is a block diagram conceptually illustrating aspects of an example of a base station and user equipment.

FIG. 2 depicts aspects of an example base station (BS) 102 and a user equipment (UE) 104. As shown, the RIS 114 may assist the communications, by receiving and re-radiate radio signals, between the BS 102 and UE 104. For example, the RIS 114 may re-radiate the transmissions from one of the BS 102 or UE 104 to the other using reflection, refraction, or other passive or active mechanisms.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes an interference cancellation assistance component 281, which may be representative of the interference cancellation assistance component 198 of FIG. 1. Notably, while depicted as an aspect of controller/processor 280, the interference cancellation assistance component 281 may be implemented additionally or alternatively in various other aspects of user equipment 104 in other implementations.

Figure 6:
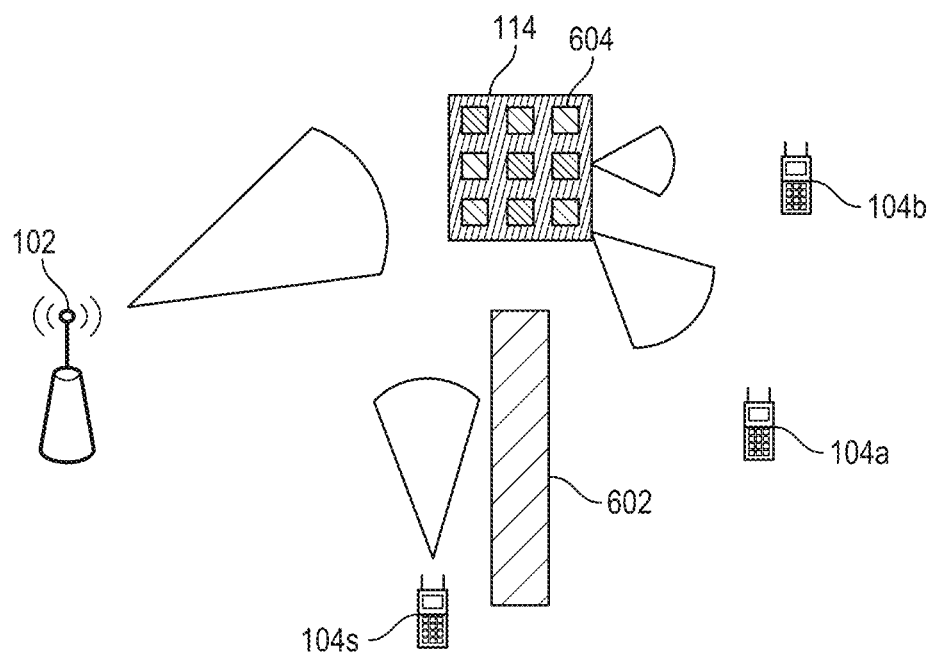
FIG. 6 illustrates an example of using a reconfigurable intelligent surface (RIS) to overcome a blockage in a wireless communication network, according with certain aspects of the present disclosure.

The RIS 114 may be configured or controlled by the RIS controller 216. RIS elements may re-radiate radio signals between the UE and BS with certain phase shifts or amplitude changes as controlled by the RIS controller 216. The RIS controller 216 may reconfigure the phase or amplitude changes by applying a precoding weight to RIS elements to enable the RIS 114 to re-radiate an output beam at different directions given a particular input beam. An illustrative deployment example of the RIS 114 is shown in FIG. 6. According to the present disclosure, the RIS controller 216 includes an interference cancellation component 218 that performs interference cancellation via reflections from the RIS 114 for interference that will occur at a wireless node (e.g., the UE 104) based at least in part on one or more criteria, in accordance with aspects described herein.

While the RIS controller 216 is depicted as a separate network entity in communication with the RIS 114 to facilitate understanding, aspects of the present disclosure may be applied to the RIS controller 216 being integrated or co-located with the RIS 114, the BS 102, and/or another UE.

While the UE 104 is described with respect to FIGS. 1 and 2 as communicating with a BS and/or within a network, the UE 104 may be configured to communicate directly with/ transmit directly to another UE 104, or with/to another wireless communication device without relaying communications through a network. In some aspects, the BS 102 illustrated in FIG. 2 and described above is an example of another UE 104.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, sidelink communications may use beamforming in mmWave bands.

Example V2X Systems

Figure 4B:
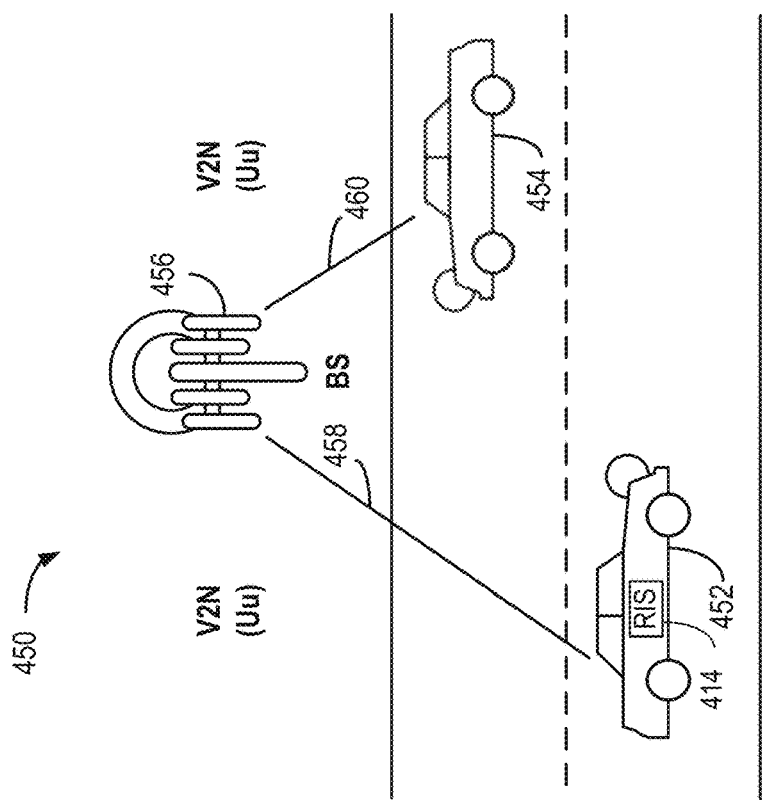
FIG. 4A and FIG. 4B show diagrammatic representations of example vehicle to everything (V2X) systems, in accordance with certain aspects of the present disclosure.
Figure 4A:
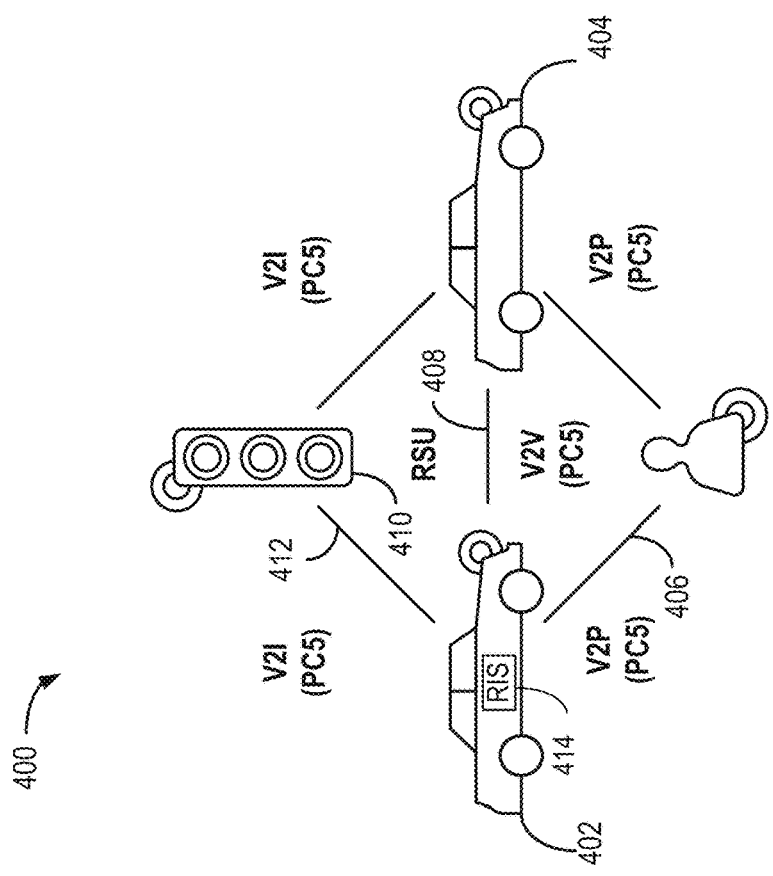

Sidelink communications may include vehicle-to-everything (V2X) communications. FIG. 4A and FIG. 4B show diagrammatic representations of example V2X systems, in accordance with some aspects of the present disclosure. For example, the vehicles shown in FIG. 4A and FIG. 4B may communicate via sidelink channels and may relay sidelink transmissions as described herein. The V2X systems, may be examples of sidelink communication systems discussed herein, and the vehicles and other devices may be configured to communicate over sidelink frequency channels as discussed herein.

The V2X systems provided in FIG. 4A and FIG. 4B provide two complementary transmission modes. A first transmission mode (also referred to as mode 4), shown by way of example in FIG. 4A, involves direct communications (for example, also referred to as sidelink communications) between participants in proximity to one another in a local area. A second transmission mode (also referred to as mode 3), shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle-to-vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 460 may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

In certain aspects, a RIS 414 may be deployed in the V2X system 400, 450. For example, a RIS 414 may be coupled to a vehicle (402, 452) to facilitate reflection of sidelink communications, as further described herein.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Figure 5:
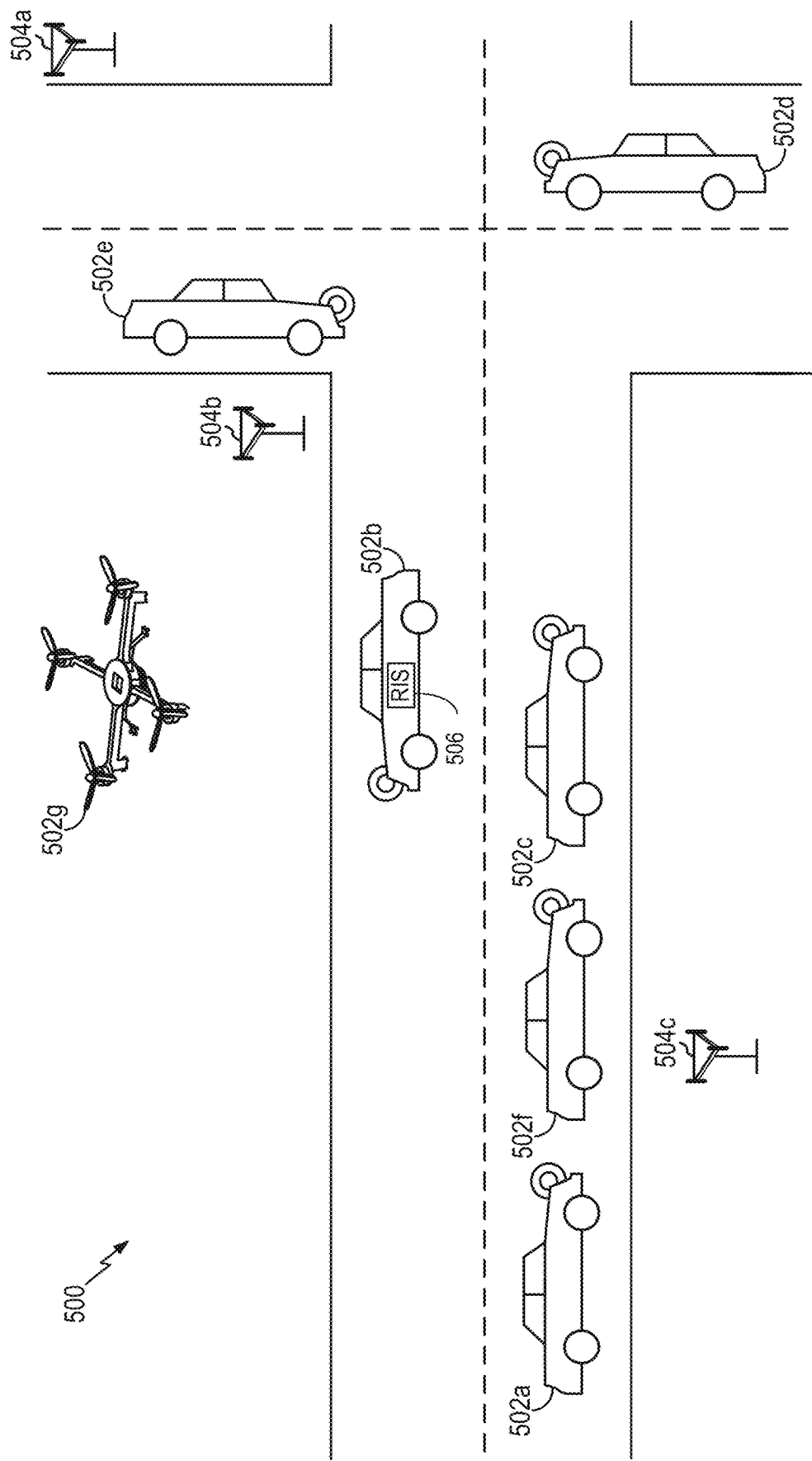
FIG. 5 is a schematic diagram illustrating an example model of multiple wireless devices operating in an unlicensed spectrum, in accordance with certain aspects of the present disclosure.

FIG. 5 is a schematic diagram illustrating an example network 500 of multiple cellular vehicle-to-everything (CV2X) devices operating in an unlicensed spectrum. The unlicensed spectrum may be an example of a sidelink frequency band. An unlicensed band in an unlicensed spectrum refers to any frequency band(s) that are not subject to licensed use under regulatory practice, such that they are open to use by any devices, and not just devices that have a license to use the particular frequency band(s). Further, the network 500 may be an example of a sidelink communication system. The CV2X devices 502 may be configured to communicate on sidelink frequency channels as discussed herein. For example, any of the CV2X devices 502 may communicate with any other of the CV2X devices 502.

In the illustrated example, seven CV2X devices (e.g., a first CV2X device 502a, a second CV2X device 502b, a third CV2X device 502c, a fourth CV2X device 502d, a fifth CV2X device 502e, a sixth CV2X device 502f, and a seventh CV2X device 502g)—collectively referred to as CV2X devices 502) may operate in an unlicensed spectrum with other non-CV2X devices (e.g., non-CV2X devices 504a-c—collectively referred to as non-CV2X devices 504). In some examples, the first CV2X device 502a, the sixth CV2X device 502f, and the third CV2X device 502c may be part of a fleet or platoon. In transportation, platooning or flocking is a method for driving a group of vehicles together. It is meant to increase the capacity of roads via an automated highway system. Platoons decrease the distances between cars or trucks, such as based on SL communications.

Although the example provided is illustrative of six automotive CV2X devices in a traffic setting and a drone or other aerial vehicle CV2X device, it can be appreciated that CV2X devices and environments may extend beyond these, and include other wireless communication devices and environments. For example, the CV2X devices 502 may include UEs (e.g., UE 120 of FIG. 1) and/or road-side units (RSUs) operated by a highway authority, and may be devices implemented on motorcycles or carried by users (e.g., pedestrian, bicyclist, etc.), or may be implemented on another aerial vehicle such as a helicopter.

The CV2X devices 502 may include UEs (e.g., UE 120 of FIG. 1), and may be devices implemented on motorcycles or carried by users (e.g., pedestrian, bicyclist, etc.), or implemented as a roadside unit.

In certain aspects, a RIS 506 may be deployed in the network 500. For example, the RIS 506 may be coupled to a CV2X device 502 to facilitate reflection of sidelink communications, as further described herein.

Introduction to Communications with a RIS

A RIS may be deployed to reflect electromagnetic waves in in specified directions based on electrical control applied across the RIS. A RIS can provide directional control of the reflected wave/beam and introduce lower losses due to reflection compared to other reflectors (e.g., a wall or passive repeater). In some cases, a RIS may operate without substantial power consumption when the RIS operates passively to reflect or refract beams from a transmitter toward a receiver. In some cases, the reflection or refraction direction of a RIS may be controlled by a RIS controller, such as a base station, network controller, or a UE (e.g., a sidelink monitoring UE). As described herein with respect to FIGS. 4A, 4B, and 5, a RIS may be implemented in sidelink communications, e.g., V2X and/or device-to-device (D2D) communications. Due to motion between vehicles or change in environment due to motion, a RIS can be used to provide coverage enhancements in V2X systems, as further described herein. In a distributed system (e.g., V2X systems), collisions among transmissions are more likely to occur, which can affect weaker links. A RIS may be used to enhance the signal quality of weaker links, as further described herein.

A RIS can alter the nature of the communication environment. A RIS may enable the reflection of transmission around a blockage, especially in mmWave bands, for example, as described herein with respect to FIG. 6. In certain cases, the direct path may be weak due to blockage, where the path through the RIS is dominant (as reflection losses may be minimal). A RIS may enable signal enhancement through additional signal paths (e.g., a line of sight path from a transmitter and an indirect path from a RIS) to a UE and/or interference cancellation, as further described herein. For example, the RIS may adjust the reflected wave to constructively enhance with a line of sight signal at the receiver.

FIG. 6 illustrates an example of using a MS (such as the MS 114 of FIGS. 1 and 2) to overcome blockage 602 in a wireless communications network. As shown, a MS 114 may be arranged to reflect or otherwise re-radiate the radio signals from the BS 102a to bypass the blockage 602. For example, the two-way communications between the BS 102a and the UE 104a may be enabled by the RIS 114 re-radiating one or more beams from the BS 102a toward the UE 104a, or vice versa. Furthermore, the RIS 114 can also be configured (e.g., directing incoming and outgoing beams at different angles) to enable the UEs 104s and 104a to communicate via sidelink channels, for example, around the blockage 602.

The RIS 114 may perform passive beamforming. For example, the RIS 114 may receive signal power from the transmitter (e.g., the BS 102a, UE 104a, or UE 104s) proportional to a number of RIS elements 604 thereon. When the RIS reflects or refracts the radio signal, the RIS elements 604 cause phase shifts to perform conventional beamforming or precoding. The phase shifts may be controlled by precoding weights (e.g., a multiplier or an offset of time delay) applied to the RIS elements. For an array of RIS elements, such as an m×n rectangular matrix, for example, a respective precoding weight may be generated or specified for each of the RIS element by a RIS controller. In certain aspects, the RIS 114 may be implemented as a reflectarray with a passive antenna array, such that the RIS element 604 may be implemented as an antenna coupled to a phase shifter. In certain aspects, the RIS 114 may be implemented with metasurfaces, such that the RIS element 604 may be implemented as a reconfigurable metasurface that can impose an amplitude and/or phase profile on an incident RF signal. The RIS elements can be controlled to reflect an incident electromagnetic wave in a desired direction (e.g., azimuth and/or elevation) and/or with a desired beamwidth.

Accordingly, what is needed are techniques and apparatus for implementing a RIS for interference cancellation, for example, in sidelink communications.

Aspects Related to Reconfigurable Intelligent Surface-Based Interference Cancellation Aspects of the present disclosure provide techniques and apparatus for RIS-based interference cancellation, for example, in sidelink communications. For distributed sidelink communications, interference may degrade system performance. A RIS may be used to reduce or cancel the interference encountered by certain wireless nodes (e.g., UEs), for example, due to colliding sidelink transmissions. In certain cases, a network entity may autonomously detect interference in a wireless network and determine to perform interference cancellation with a RIS. The network entity may use sensing information measured at the network entity and/or additional information from other wireless nodes to determine whether to perform the interference cancellation. In certain cases, the RIS-based interference cancellation may be triggered based on requests from wireless nodes in the network, such as wireless nodes experiencing interference or wireless nodes that will cause interference.

The RIS-based interference cancellation described herein may provide desirable sidelink performance, such as reduced latencies and/or higher data rates. For example, the RIS-based interference cancellation described herein may be used to destructively interfere with interfering transmissions encountered at certain wireless nodes.

The RIS-based interference cancellation described herein may be implemented for sidelink communications, such as V2X, V2V, and/or D2D communications. Example sidelink communications include V2X communications. Though certain aspects may be discussed with respect to V2X communications in a V2X communications system, it should be noted that the aspects may equally apply to other suitable types of sidelink communications systems.

Figure 7:
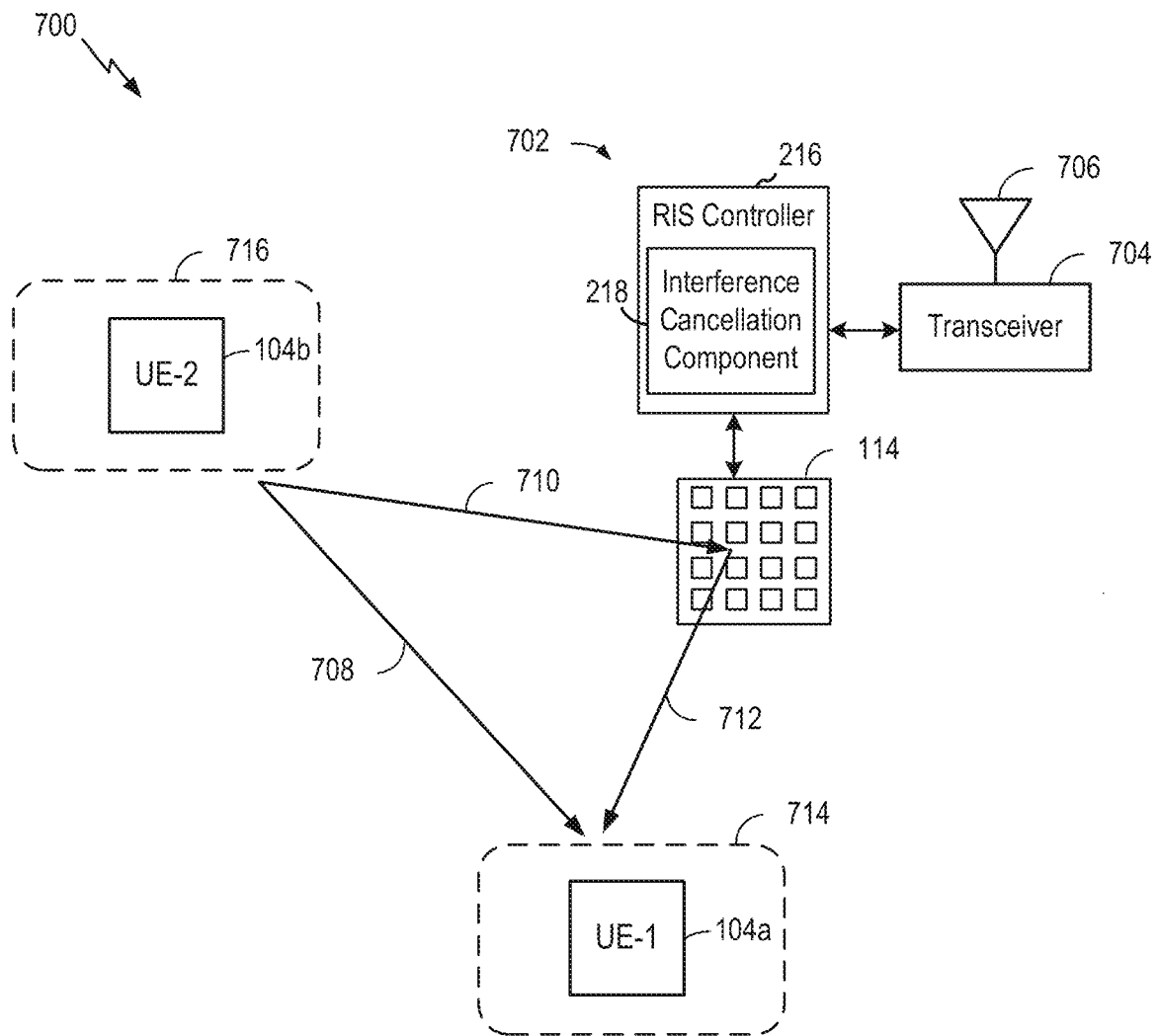
FIG. 7 is a diagram illustrating an example sidelink communications network with a RIS used for interference cancellation, in accordance with certain aspects of the present disclosure.

FIG. 7 is a diagram illustrating an example sidelink communications network 700 with a RIS 114 used for interference cancellation, in accordance with certain aspects of the present disclosure. An assisting node 702 may include the RIS 114, the RIS controller 216, and a transceiver 704. In certain aspects, the assisting node 702 may control a plurality of RISs 114 for interference cancellation. The RIS controller 206 may be coupled to the transceiver 704, which may be configured to transmit (or send) and receive signals for the assisting node 702 via an antenna 706, such as the various sidelink signals as described herein. The assisting node 702 may monitor for resource reservations (e.g., sidelink resource reservations via sidelink control information (SCI)) and/or measure network congestion via the transceiver 704. The assisting node 702 may detect whether there are interfering transmissions occurring at one or more wireless nodes, such as the first UE 104a, based at least in part on the resource reservations and/or measurements by the assisting node 702.

The assisting node 702 may communicate with the first and second UEs 104a, 104b via the transceiver 704. For example, the assisting node 702 may transmit, to the first UE 104a and/or the second UE 104b, a notification that the assisting node 702 will perform interference cancellation for the interference occurring at the first UE 104a. The assisting node 702 may receive various messages from the wireless nodes in the network, such as a request to perform interference cancellation and/or one or more reports with information related to the interference cancellation.

The first UE 104a may be encountering interference from the second UE 104b, for example, via the direct link 708. The assisting node 702 may detect past and/or future collisions occurring at the first UE 104a due to the interfering transmissions on the direct link 708 from the second UE 104b. A collision may refer to transmissions from separate wireless nodes that overlap in at least the time domain, and in certain cases, the frequency domain. A wireless node that transmits the interference may be referred to as an aggressor, and the wireless node that encounters the interference may be referred to as a victim.

The assisting node 702 may perform interference cancellation with the RIS 114 in response to the detected collisions, for example. The RIS 114 may receive the interfering transmissions from the second UE 104b on the indirect link 710 and reflect or refract destructive interference, for example, on the reflection link 712 towards the first UE 104a. The RIS controller 216 may adjust the beamwidth (e.g., beam shape or radiation pattern) and/or orientation (e.g., azimuth and/or elevation) of the reflections from the RIS 114. In aspects, the interference cancellation may include forming a reflection or refraction with a waveform that mitigates (e.g., cancels or attenuates via destructive interference by changing the phase of the reflected signal) interference received at a wireless node (such as the first UE 104a).

The interference cancellation may be performed for interference occurring at a plurality of wireless nodes in a first zone 714 (or plurality of first zones). For example, the coverage area of the reflection or refraction from the RIS 114 may cover the wireless node(s) in the first zone 714. In certain cases, the coverage area of the reflections or refractions may cover multiple zones. The interference cancellation may be performed based on interference from a plurality of wireless nodes in a second zone 716 or a plurality of second zones. For example, the RIS 114 may receive interfering transmissions from a plurality of wireless nodes in the second zone(s) 716 and reflect destructive interference on the reflection link 712.

Figure 8:
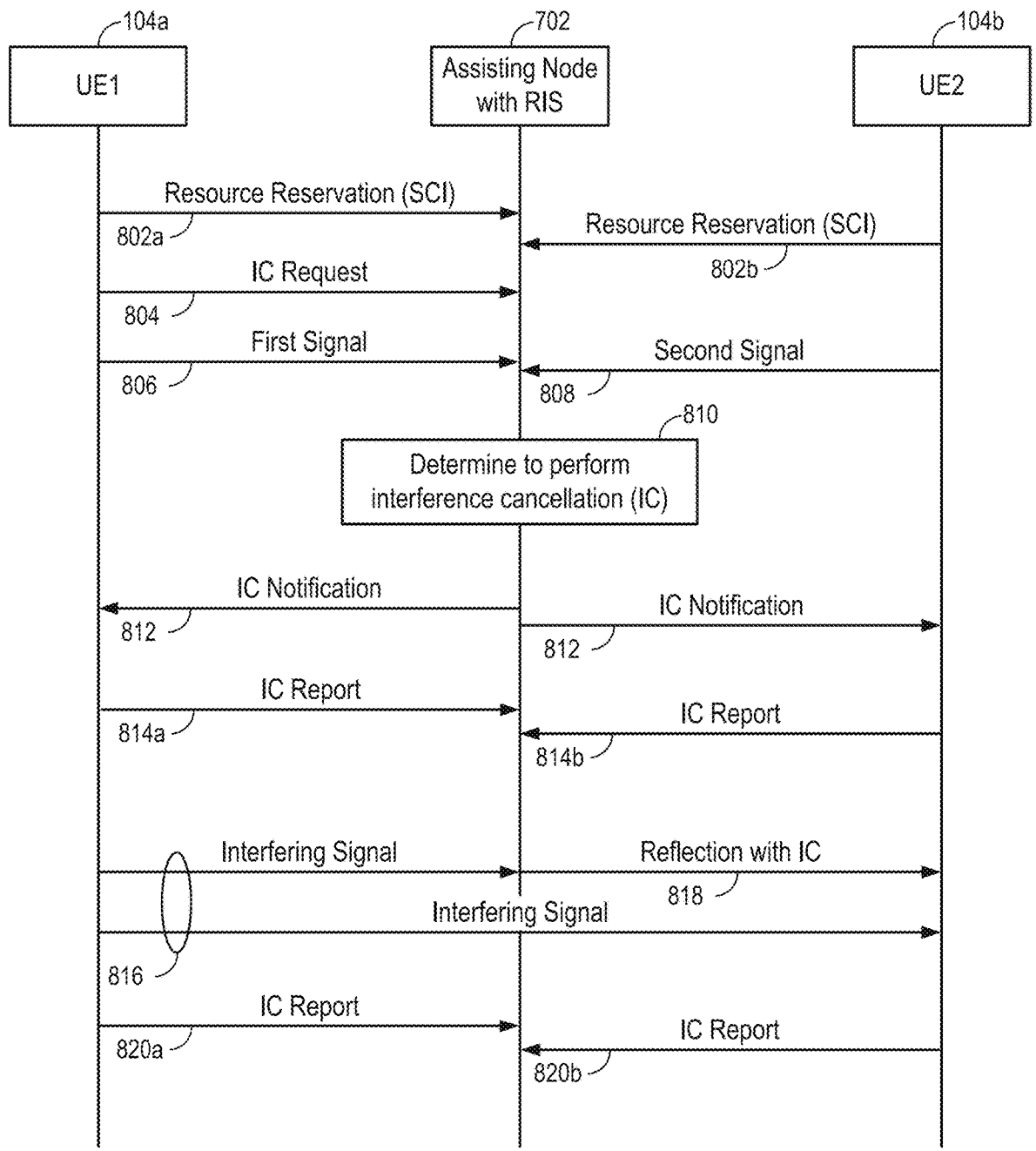
FIG. 8 is a signaling flow diagram illustrating example signaling for RIS-based interference cancellation, in accordance with certain aspects of the present disclosure.

FIG. 8 is a signaling flow diagram illustrating example signaling for interference cancellation, in accordance with certain aspects of the present disclosure. At 802a and/or 802b, the assisting node 702 may receive indications of resource reservations from the first and second UEs 104a, 104b. For example, the resource reservations may be received via SCI associated with broadcast, multicast, or unicast message transmissions by the respective UEs 104a, 104b. In certain cases, the resource reservations from two or more UEs may indicate that there will be future collision(s), for example, occurring at the second UE 104b.

At 804, the assisting node 702 may receive a request to perform interference cancellation. For example, in preparation of an interfering transmission, the first UE 104a may request the assisting to perform the interference cancellation for interference occurring at the second UE 104b. In certain cases, the wireless node that will encounter the interference may request the assisting node 702 to perform the interference cancellation.

At 806 and 808, the assisting node 702 may receive a first signal from the first UE 104a and a second signal 104b, where the first and second signals may be indicative of collision(s), for example, occurring at the second UE 104b.

At 810, the assisting node 702 may determine to perform interference cancellation for the interference occurring at the second UE 104b based at in least in part on certain criteria. For example, the assisting node 702 may determine based on the resource reservations and/or request that collisions will occur at the second UE 104b. The assisting node 702 may determine based on the first and second signals that collisions have occurred at the second UE 104b. In response to one or more of these criteria, the assisting node 702 may determine to perform the interference cancellation for the second UE 104b.

At 812, the assisting node 702 may transmit, to the first UE 104a and/or the second UE 104b, a notification that the assisting node 702 will perform interference cancellation. In certain aspects, the notification may include when the interference cancellation will occur. The notification may include where the interference cancellation will be transmitted, for example, based on the identifier(s) of UEs in the coverage area of the interference cancellation and/or a zone identifier associated with one or more UEs in the coverage area of the interference cancellation.

At 814a and/or 814b, the assisting node 702 may receive, from the first UE 104a and/or the second UE 104b, one or more reports having information related to the interference cancellation. For example, the information in the report(s) may include sensing information, channel measurements, retransmission information, collision information, and/or traffic information associated with the transmissions from the first UE 104a. The assisting node 702 may use the information to adjust the interference cancellation (e.g., phase, timing, beamwidth, orientation) or decide whether to perform the interference cancellation.

At 816, the first UE 816 may transmit the interfering signal, which are received at the second UE 104b and a RIS (not shown) of the assisting node 702. For example, the interfering signal may be data or control transmissions to one or more other UE(s) (not shown).

At 818, the RIS of the assisting node 702 may reflect the interfering transmissions in the direction of the second UE 104b, such that destructive interference is received at the second UE 104b, for example, as described herein with respect to FIG. 7. The second UE 104b may use the reflections with interference cancellation from the assisting node 702 to mitigate the interference received from the first UE 104a.

At 820a and/or 820b, the assisting node 702 may receive, from the first UE 104a and/or the second UE 104b, one or more reports having information related to the interference cancellation, such as the information described herein with respect to 814a, 814b. The assisting node 702 may use the information to adjust the interference cancellation and/or determine whether to continue performing the interference cancellation. The report(s) at 820a and/or 820b may be periodic report(s) from the UE(s) 104a, 104b, which are transmitted while the assisting node 702 performs the interference cancellation. In certain aspects, the report(s) at 820a and/or 820b may be aperiodic, for example, where transmission of the report is triggered by a specific event and/or criteria, such as successful or unsuccessful packet reception at the second UE 104b, an increase in channel congestion, and/or receiving a negative acknowledgement (NACK) from a peer wireless node, for example, at the first UE 104b.

While the example depicted in FIG. 8 is described herein with respect to an assisting node performing interference cancellation for interference occurring at a second UE from a first UE to facilitate understanding, aspects of the present disclosure may also be applied to cases where the interference cancellation is for interference occurring at a plurality of wireless nodes located in one or more zones, or where the interference is transmitted by a plurality of wireless nodes located in one or more zones.

Figure 9:
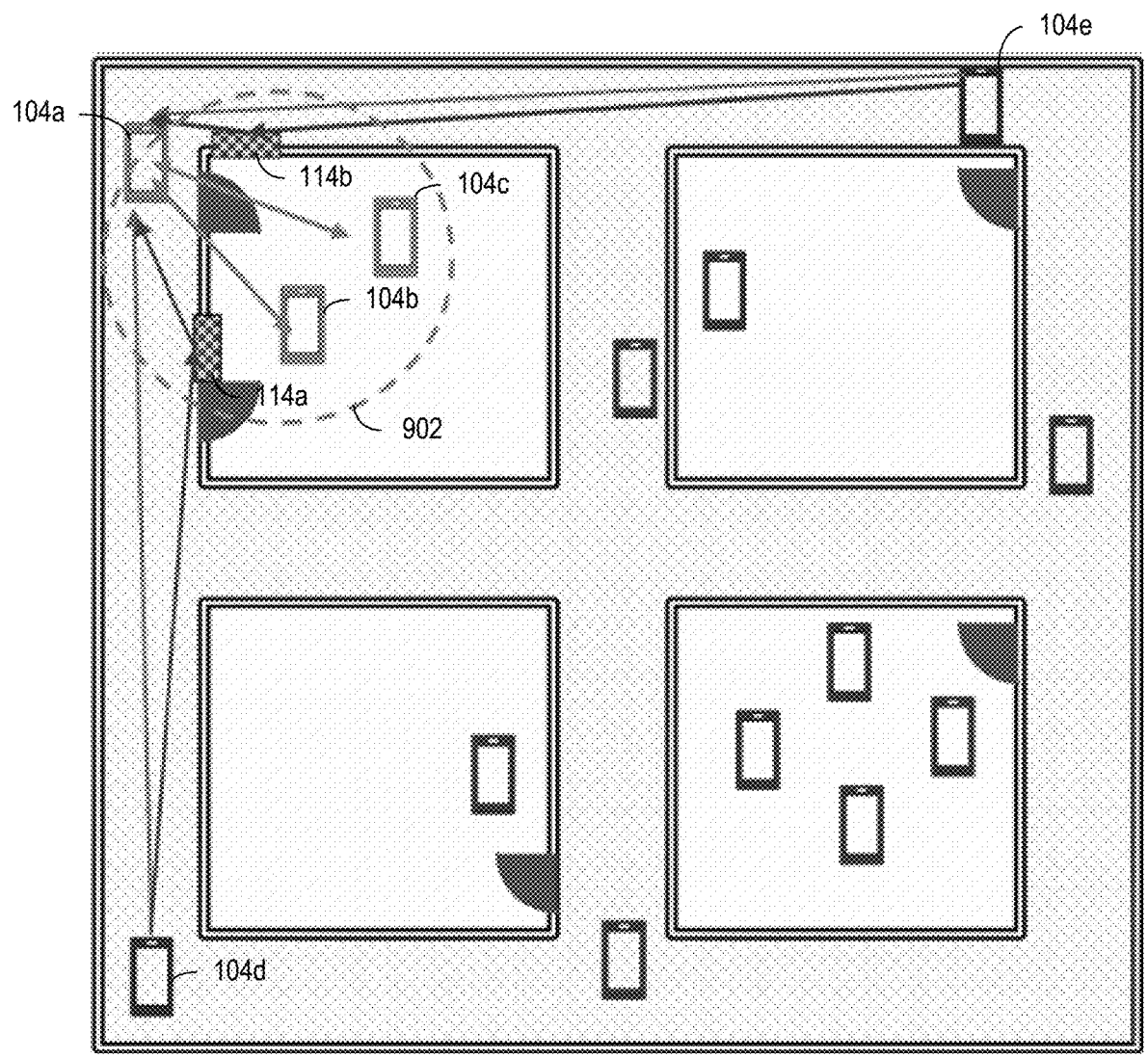
FIG. 9 is a diagram illustrating an example sidelink environment where interference cancellation with a RIS may enhance certain sidelink transmissions, in accordance with certain aspects of the present disclosure.

FIG. 9 is a diagram illustrating an example sidelink environment where interference cancellation with a RIS may enhance certain sidelink transmissions, in accordance with certain aspects of the present disclosure. In this example, the UEs 104a, 104b, 104cc are in a sidelink communication group 902, where the UEs 104a-c may communicate with each other via sidelink communication channels. As the first UE 104a is located outside of a room from the second and third UEs 104b, 104c, the links to the first UE 104a in the group 902 may be poor, for example, due to the links being not line of sight.

In certain cases, there may be other UEs (e.g., the fourth UE 104d and the fifth UE 104e) located at in the corridor or hallway with line of sight links to the first UE 104a. Transmissions from the fourth UE 104d and/or the fifth UE 104e on the light of sight link to the first UE 104a may interfere with the transmissions in the group 902. The line of sight links for the fourth UE 104d and/or the fifth UE 104e may be stronger than the links for the first UE 104a in the group 902. In groupcast scenarios, the interference from the fourth UE 104d and/or the fifth UE 104e may lead to collisions and considerable degradation in reliability for the first UE 104a.

RISs 114a, 114b may be arranged in the corridor to perform interference cancellation, as described herein. The RIS-based interference cancellation may provide desirable sidelink performance for the communications in the group 902. For example, the first RIS 114a may reflect the transmissions from the fourth UE 104d with a certain phase, power, and direction, such that the reflections destructively interfere with the line of sight transmissions from the fourth UE 104d at the first UE 104a.

While the example depicted in FIG. 9 is described herein with respect to interference occurring in a building to facilitate understanding, aspects of the present disclosure may also be applied to interference cancellation performed in other suitable environments, such as V2X applications.

Figure 10:
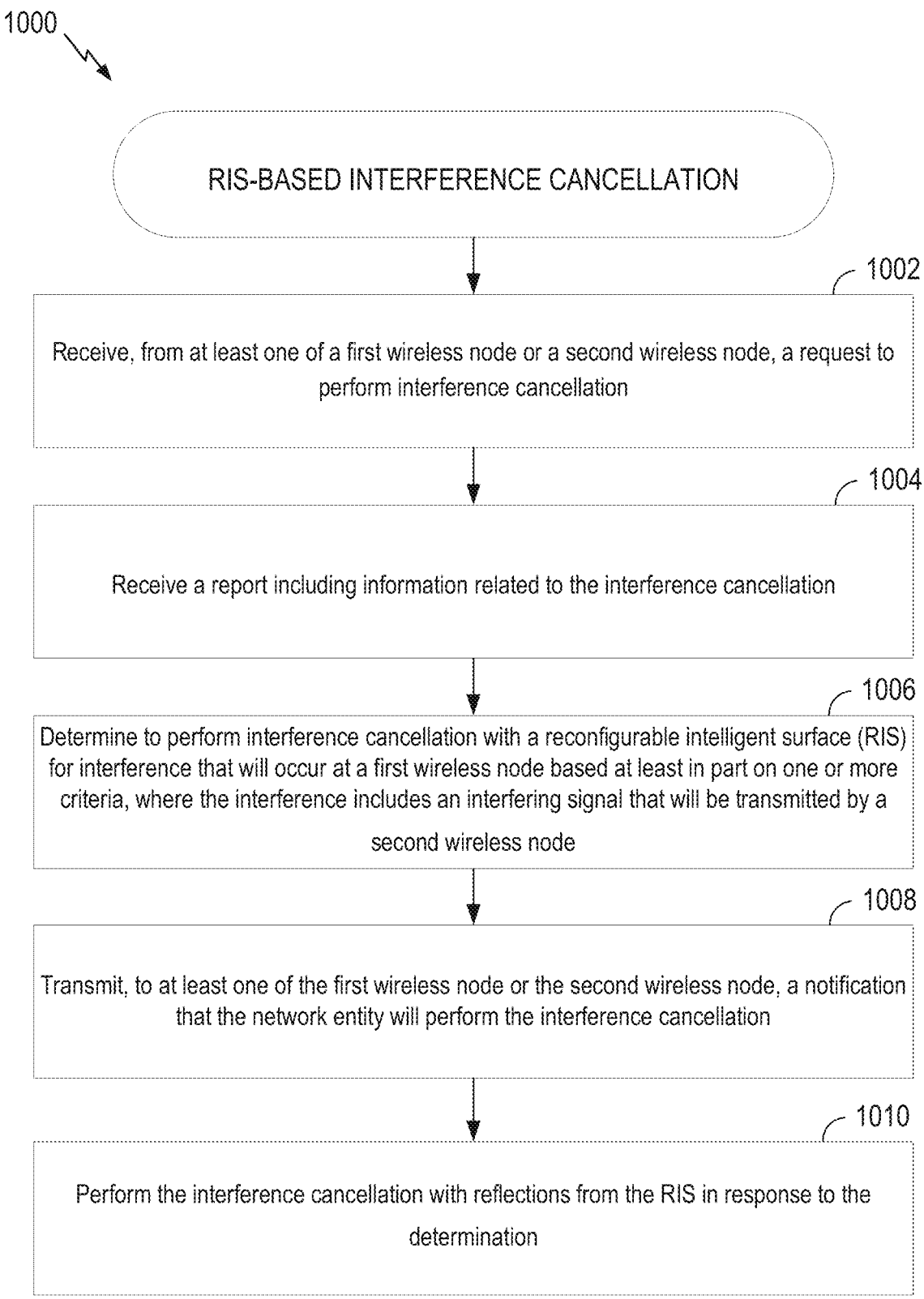
FIG. 10 is a flow diagram illustrating example operations for wireless communication, for example, by an assisting node, in accordance with certain aspects of the present disclosure.

FIG. 10 is a flow diagram illustrating example operations 1000 for wireless communication, in accordance with certain aspects of the present disclosure. The operations 1000 may be performed, for example, by a network entity (such as the assisting node 702 in FIG. 7, the UE 104, and/or the BS 102 in FIG. 1). The operations 1000 may be implemented as software components that are executed and run on one or more processors (e.g., controller/processor 280 of FIG. 2). Further, the transmission and reception of signals by the network entity in operations 1000 may be enabled, for example, by one or more antennas (e.g., antennas 252 of FIG. 2). In certain aspects, the transmission and/or reception of signals by the network entity may be implemented via a bus interface of one or more processors (e.g., controller/processor 280) obtaining and/or outputting signals. As used herein, the network entity may refer to a wireless communication device in a wireless communication network and/or a radio access network, such as an assisting node, a user equipment, a base station, a remote radio head or antenna panel in communication with a base station, and/or a network controller.

The operations 1000 may optionally begin, at block 1002, where the network entity may receive, from a first wireless node (e.g., the first UE 104a in FIG. 7) and/or a second wireless node (e.g., the second UE 104b in FIG. 7), a request to perform interference cancellation, for example, for interference occurring at the first wireless node. The interference may be or will be transmitted by at least the second wireless node.

Optionally, at block 1004, the network entity may receive a report, from the first wireless node and/or the second wireless node, including information related to the interference cancellation. For example, the information may include one or more channel measurements, retransmission information, collision information, and/or traffic information associated with the interfering transmissions from the second wireless node.

At block 1006, the network entity may determine to perform interference cancellation with a RIS (e.g., the RIS 114) for interference (e.g., an interfering signal) that will occur at the first wireless node based at least in part on one or more criteria. The interference may include an interfering signal that will be transmitted by the second wireless node. The criteria may include the request for interference cancellation, the report including the information related to the interference cancellation, and/or one or more channel measurements taken or sensing information obtained by the network entity. The criteria may be used in autonomous detection scenarios or request-based scenarios. In certain cases, the network entity may autonomously determine to perform the interference cancellation, for example, based on the criteria. In such cases, the criteria may include sensing information, channel measurements, or resource reservations indicating a collision between transmissions that will cause the interference, for example. In certain cases, the network entity may determine to perform the interference cancellation in response to the request at block 1002. In such cases, the criteria may include the request for interference cancellation.

Optionally, at block 1008, the network entity may transmit, to the first wireless node and/or the second wireless node, a notification that the network entity will perform the interference cancellation. The notification may indicate which wireless node(s) will receive the interference cancellation, which wireless node(s) cause the interference, and/or when the interference cancellation occur, for example.

At block 1010, the network entity may perform the interference cancellation with reflections (and/or refractions) from the RIS in response to the determination at block 1006. For example, the RIS may adjust the amplitude and/or phase of the interference received from the second wireless node and reflect or refract destructive interference to the first wireless node, as described herein with respect to FIG. 7.

In certain aspects, the network entity may determine to perform the interference cancellation autonomously, for example, without an instruction to do so from another wireless node and/or another network entity.

The network entity may determine that interference cancellation is beneficial for one or more wireless nodes based on certain criteria. The criteria may include future resource reservations. For example, the resource reservations may included in SCI from UEs or enhanced resource reservation information (e.g., inter-UE coordination based resource reservations). The resource reservations may indicate the time domain and frequency domain resources for future transmissions, such that the some of the resource reservations may indicate collisions will occur at one or more wireless node, such as the first wireless node.

The criteria may include channel measurements or sensing information taken at the network entity or at other wireless devices. The network entity may monitor the network congestion of sidelink communication channels. For example, the network entity may measure the network congestion based on the channel busy ratio (CBR), which is the ratio of the time when the channel is perceived as busy to the monitoring interval, or other network performance metrics, such as packet loss rate or inter-packet delay. The network entity may detect past or future collisions based on the sensing information. The network entity may determine when the interference cancellation will occur based on RIS availability, time domain occasions of the resource reservations (e.g., reservation periodicity), or traffic periodicity, for example, as indicated by the channel measurements.

The network entity may determines which link(s) (e.g., the reflection link 712) or zone(s) (e.g., the first zone 714) will benefit from the interference cancellation. The determination may be made based on the past and future collision statistics measured and/or obtained at the network entity.

The determination may be based on priority, service type, range associated with transmissions from the aggressor and/or victim wireless nodes. The network entity may consider the distance information related to the wireless nodes and/or coverage area of the interference cancelation in determining which wireless nodes may benefit from the interference cancellation and/or which wireless nodes may be out of the coverage area of the RIS. For example, the criteria for the determination at block 1006 may include distance information related to the wireless nodes, coverage area of the interference cancellation, and/or zones of the wireless nodes. The network entity may consider the distance between the aggressor wireless node and the victim wireless node, the distance between the network entity (or RIS) and the victim wireless nodes, the distance between the network entity (or RIS) and the aggressor wireless nodes, and/or the distance between the network entity (or RIS) and the coverage area of the reflections and/or zone of the wireless nodes.

In certain aspects, the one or more criteria at block 1006 may include at least one of resource reservations (e.g., SCI or enhanced resource reservations) that indicate the interference will occur at the first wireless node; one or more channel measurements (e.g., CBR or other performance metrics); a request to perform the interference cancellation from at least one of the first wireless node or the second wireless node; a report, from at least one of the first wireless node or the second wireless node, including information related to the interference cancellation; a first distance between the network entity and the first wireless node; a second distance between the network entity and the second wireless node; a third distance between the network entity and a coverage area of the reflections; or a priority, service type, or range associated with transmissions from at least one of the first wireless node or the second wireless node.

The network entity may determine a coverage area of the reflections to provide the interference cancellation for the first wireless node and/or a plurality of wireless nodes including the first wireless node. For example, the network entity may adjust the beamwidth of the reflections from the RIS to provide the coverage area of the interference cancellation. The network entity may form reflections, using the RIS, within the determined coverage area.

The network entity may broadcast, multicast (groupcast), or unicast the notification to the wireless node at block 1008. The network entity may use an existing unicast link or initiate a unicast link establishment to the respective wireless nodes to provide the notification. In certain aspects, the notification at block 1008 may indicate certain information to the wireless nodes. The information in the notification may include identifiers associated with the victim and/or aggressor wireless nodes or zone identifiers associated with zones for the victim and/or aggressor wireless nodes. The information may provide a list of the identifiers associated the victim and/or aggressor wireless nodes. The information may include when the interference cancellation will occur, such as an indication of time domain resources or a time division duplexing (TDD) pattern representing the time periods (or occasions) over which the interference cancellation will be applied. The information may include an indication of whether feedback (e.g., a report, an acknowledgement, or a negative acknowledgement) is expected from the aggressor and/or victim wireless nodes.

The notification at block 1008 may include at least one of a first identifier associated with the first wireless node; a second identifier associated with the second wireless node; a zone identifier associated with a group of wireless nodes that will transmit the interference or receive the interference; a first indication of when the interference cancellation will occur; or a second indication of whether feedback is expected from the first wireless node or the second wireless node.

In certain aspects, the network entity may receive a response to the notification from the wireless node(s). The response may indicate whether the wireless node accepts or rejects the interference cancellation proposed by the network entity in the notification. If the response indicates that a wireless node rejects the proposed interference cancellation, the network entity may refrain from performing the interference cancellation or cease to perform the interference cancellation at block 1010. The rejection may trigger the network entity to refrain from performing the interference cancellation. As an example, the network entity may receive, from at least one of the first wireless node or the second wireless node, an indication of whether the interference cancellation is accepted or rejected. The network entity may continue to perform the interference cancellation if the interference cancellation is accepted, or cease to perform (or refrain from performing) the interference cancellation if the interference cancellation is rejected.

For certain aspects, the response may indicate to adjust the interference cancellation proposed by the network entity in the notification. The network entity may receive, from the first wireless node and/or the second wireless node, a request to adjust the interference cancellation, and the network entity may adjust the interference cancellation based on the request. For example, the response may indicate to adjust (e.g., add or remove) the wireless nodes covered by the interference cancellation or adjust the timing of the interference cancellation, such as shifting or adjusting the occasions in the TDD pattern indicated in the notification.

In certain cases, the network entity may seek input from the wireless nodes. For example, the network entity may transmit, to the first wireless node and/or the second wireless node, a request for a report including information related to the interference cancellation. The request may be sent over a unicast, broadcast, or groupcast transmission. The network entity may request for the wireless node(s) to provide the report before determining whether to perform the interference cancellation and/or after autonomously determining to perform the interference cancellation based on self-measurements. The network entity may receive the report in response to the request for the report and/or the notification. In certain cases, the network entity may receive the report before performing the interference cancellation, where the one or more criteria at block 1008 includes the information in the report. The network entity may determine to refrain from performing the interference cancellation based on the report.

The request may indicate which wireless nodes are asked to respond, for example, by way of identifiers associated with the wireless nodes or zones, location information, range information, etc. The request may indicate what information to include in the report, such as one or more of channel measurements, CBR, channel occupancy ratio (CR), past collisions, retransmission information, etc. The channel measurements may include measurements of the aggressor wireless node's signal measured at the victim wireless node, such as a signal-to-noise ratio (SNR), signal-to-interference plus noise ratio (SINR), signal-to-noise plus distortion ratio (SNDR), a received signal strength indicator (RSSI), reference signal received power (RSRP), reference signal received quality (RSRQ), and/or an average thereof. The number of retransmissions at the victim wireless node may indicate collisions occurring due to the interference from the aggressor wireless node.

The network entity may request information about the traffic (e.g., data rate), services, and/or the quality of service (QoS) parameters associated with the traffic transmitted from the aggressor wireless node and/or scheduled to be received at the victim wireless node. The service may indicate the type of service carried over the traffic, such as video, conversational voice or video, low latency service, augmented reality, or remote control. The QoS parameters may include a specific priority, guaranteed bit rate, packet delay budget, packet error rate, etc.

As an example, the information requested from the wireless nodes and/or reported may include one or more channel measurements (e.g., average RSRP and/or CBR); retransmission information (e.g., the number of retransmissions); collision information (e.g., the number and timing of collisions); and/or or traffic information (e.g., service type, QoS parameters, and/or priority) associated with the transmissions from the second wireless node and/or scheduled at the first wireless node.

In certain aspects, the network entity may receive the report(s) while performing the interference cancelation. Such reports may enable the network entity to determine whether to adjust, continue, or cease performing the interference cancellation. The reports may be received periodically from the wireless nodes. The network entity may indicate a periodicity for the wireless nodes to transmit the reports. The network may receive the report periodically while performing the interference cancellation at block 1010, and the network entity may adjust the interference cancellation based at least in part on the report. For example, the network entity may adjust the timing, power, phase, or coverage area of the interference cancellation. The network entity may adjust the RIS weights applied to certain RIS elements for the interference cancellation. In certain cases, the network entity may adjust the RIS element(s) used to perform the interference cancellation or select a different RIS to perform the interference cancellation.

In certain cases, the report may be received aperiodically, for example, in response to certain event(s) or certain criteria, which may be configured by the network entity. The event may include a request from the network entity, successful/unsuccessful packet reception, a detected increase or decrease in the CBR, an ACK/NACK from a peer wireless node, etc.

The information reported during the interference cancellation may include the same information as described herein with respect to the other reports for information related to the interference cancellation. For example, the information may include channel measurements (e.g., the RSRP and/or RSRQ of signals from the aggressor wireless node measured at the victim wireless node), CBR measurements, traffic reception statistics, packet error rates, and/or retransmission statistics. The report(s) from the aggressor wireless node may enable the network entity to determine whether the interference cancellation is hampering the transmission activity at the aggressor wireless node and take appropriate action, such as adjusting the power or coverage area of the reflections. The report from the aggressor wireless node may include an indication that the transmission reliability for the aggressor wireless node is degrading or in a degraded state.

Based on the reported information, the network entity may make no changes to the configuration for the interference cancellation at the RIS. The network entity may adjust the configuration (e.g., the RIS weights) for the interference cancellation at the RIS. In certain cases, the network entity may determine to stop the interference cancellation, for example, due to the collisions no longer occurring or the interference cancellation hampering other transmissions. The network entity may notify the wireless nodes that the interference cancellation is being adjusted, will continue, or will stop.

In certain aspects, the interference cancellation may be triggered in response to a request or instructions from a wireless node, such as the request at block 1002. The request for interference cancellation may include self-information concerning the requestor, such as location information (e.g., a zone identifier or geographic coordinates) and/or traffic information (e.g., periodicity, priority, QoS parameters, etc.). The request may include information about the wireless node or wireless nodes for which cancellation is requested, such as identifiers associated with the wireless nodes or zones. The request may indicate whether the UE or zone is associated with an aggressor or victim. The request may include an identifier associated with the first wireless node or the second wireless node; location information associated with a location of the interference; or traffic information associated with the interference.

The network entity may accept the request and send a response (e.g., the notification at block 1008) indicating when the interference cancellation will occur, such as a time schedule (e.g., a TDD pattern) indicating certain slots or frames for the interference cancellation. The network entity may receive a positive acknowledgement accepting the interference cancellation in response to the notification. The positive acknowledgement may provide an adjustment for the interference cancellation, such as an offset or change to the TDD pattern. The network entity may accept or reject the adjustment proposed by the wireless node(s). The network entity may receive a negative acknowledgement rejecting the interference cancellation. The network entity may use autonomous interference cancellation, request-based interference cancellation, or a combination thereof based on (pre)configuration.

Figure 11:
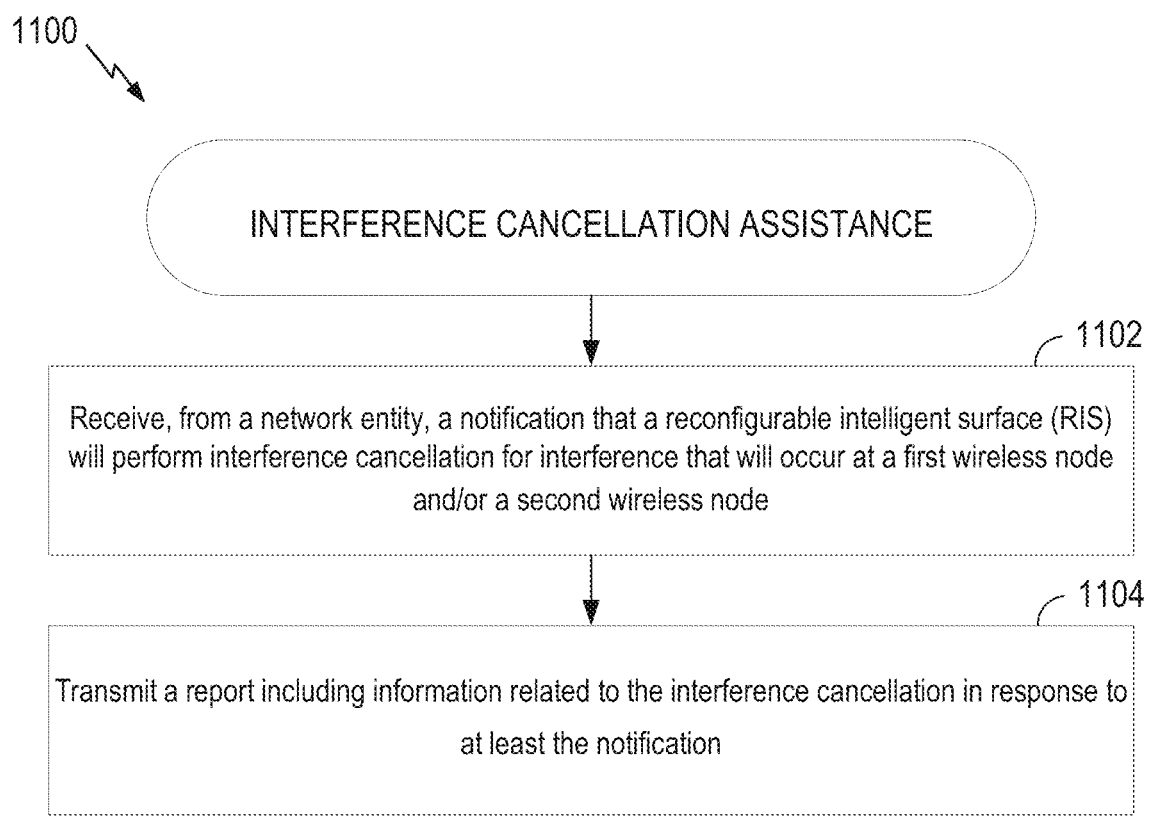
FIG. 11 is a flow diagram illustrating example operations for wireless communication, for example, by a wireless node, in accordance with certain aspects of the present disclosure.

FIG. 11 is a flow diagram illustrating example operations 1100 for wireless communication, in accordance with certain aspects of the present disclosure. The operations 1100 may be performed, for example, by a first wireless node (such as the UE 104*a* or 104*b* in FIG. 7). In this example, the first wireless node may be the victim wireless node (e.g., the first UE 104*a* in FIG. 7) or the aggressor wireless node (e.g., the second UE 104*b* in FIG. 7). The operations 1100 may be complementary to the operations 1000 performed by the network entity. The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals. As used herein, a wireless node may refer to a wireless communication device in a wireless communication network, such as a user equipment, wireless station, or the like. In certain cases, the wireless node may refer to a wireless communication device in a radio access network, such as a base station, access point, or the like.

The operations 1100 may optionally begin, at block 1102, where the first wireless node may receive, from a network entity (e.g., the assisting node 702), a notification that a RIS (e.g., the RIS 114) will perform interference cancellation for interference that will occur at a first wireless node (e.g., the first UE 104*a* if the first wireless node is the victim) or a second wireless node (e.g., the first UE 104*a* if the first wireless node is the aggressor). For example, the notification may include the information described herein with respect to the operations 1000. The first wireless node may transmit certain feedback in response to the notification. The first wireless node may transmit, to the network entity, an indication of whether the interference cancellation is accepted or rejected, and/or a request to adjust the interference cancellation. In certain aspects, the interference may include an interfering signal that will be transmitted by the first wireless node, if the first wireless node is the aggressor, or the second wireless node, if the second wireless node is the aggressor.

At block 1104, the first wireless node may transmit a report including information related to the interference cancellation in response to at least the notification. The information in the report may include one or more of the items described herein with respect to the operations 1000. The information may include at least one of one or more channel measurements; retransmission information; collision information; or traffic information associated with the transmissions from the second wireless node.

For certain aspects, the report may be transmitted in response the notification and/or a request for the report from the network entity. The first wireless node may receive, from the network entity, a request for the report including the information, and the first wireless node may transmit the report at block 1104. In response to the notification, the first wireless node may determine that the network entity has indicated that the first wireless node is affected by the interference cancellation and transmit the report. In certain cases, the first wireless node may transmit the report before the interference cancellation is performed at the network entity.

The report may be transmitted in response to criteria detected at the first wireless node, for example, as described herein with respect to the operations 1000. For example, the first wireless node may detect successful/unsuccessful packet reception, an increase or decrease in the CBR, and/or an ACK/NACK from a peer wireless node, and in response to one or more of these events, the first wireless node may transmit the report.

In certain aspects, the report may be transmitted periodically or aperiodically (e.g., in response to a request/notification from the network entity or certain events) during the interference cancellation, for example, as described herein with respect to the operations 1000. The first wireless node may be configured with a periodicity to transmit the report during the interference cancellation. The first wireless node may transmit the report periodically while the network entity performs the interference cancellation.

For certain aspects, the first wireless node may request the network entity to perform the interference cancellation, for example, in response to resource reservations indicating a collision, channel measurements, collision statistics, and/or retransmission statistics. The request may include the information described herein with respect to the operations 1000, such as an identifier associated with the first wireless node or the second wireless node; location information associated with a location of the interference; or traffic information associated with the interference. In aspects, the notification at block 1102 may be received in response to the request for the network entity to perform the interference cancellation.

In certain aspects, a RIS protocol may be used to communicate various messages among a RIS and other wireless nodes to facilitate the interference cancellation described herein. The wireless nodes may be aware of the presence of a RIS, which supports the interference cancellation described herein, in the wireless network.

Example Wireless Communication Devices

Figure 12:
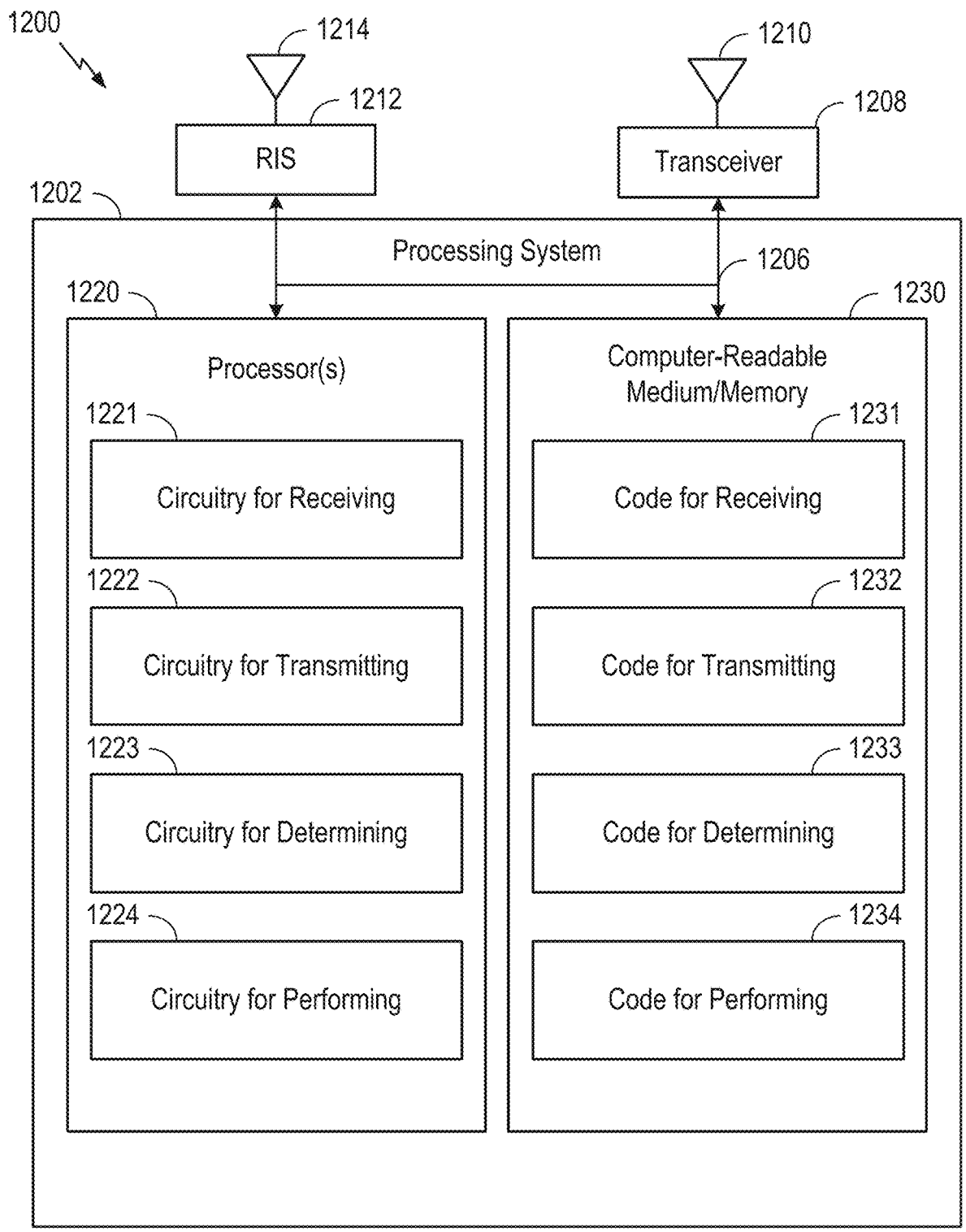
FIG. 12 depicts aspects of an example communications device.

FIG. 12 depicts an example communications device 1200 that includes various components operable, configured, or adapted to perform operations for the techniques disclosed herein, such as the operations depicted and described with respect to FIGS. 7-10. In some examples, communication device 1200 may be an assisting node as described, for example with respect to FIG. 7.

Communications device 1200 includes a processing system 1202 coupled to a transceiver 1208 (e.g., a transmitter and/or a receiver) and/or a RIS 1212 (e.g., a reflectarray and/or a metasurface). Transceiver 1208 is configured to transmit (or send) and receive signals for the communications device 1200 via an antenna 1210, such as the various signals as described herein. The RIS 1212 is configured to reflect and/or re-radiate signals for the communications device 1200 via an element 1214, such as the various signals as described herein. Processing system 1202 may be configured to perform processing functions for communications device 1200, including processing signals received and/or to be transmitted by communications device 1200, and/or further including controlling the reflections (e.g., beamwidth, orientation, phase, amplitude, etc.) of the RIS 1212.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. A-B, or other operations for performing the various techniques discussed herein for RIS-based interference cancellation.

In the depicted example, computer-readable medium/memory 1230 stores code 1231 for receiving, code 1232 for transmitting, code 1233 for determining, and/or code 1234 for determining.

In the depicted example, the one or more processors 1220 include circuitry configured to implement the code stored in the computer-readable medium/memory 1230, including circuitry 1221 for receiving, circuitry 1222 for transmitting, circuitry 1223 for determining, and/or circuitry 1224 for performing.

Various components of communications device 1200 may provide means for performing the methods described herein, including with respect to FIGS. A-B.

In some examples, means for transmitting or sending (or means for outputting for transmission) may include the transceiver 1208 and antenna 1210 of the communication device 1200 in FIG. 12.

In some examples, means for receiving (or means for obtaining) may include transceiver 1208 and antenna 1210 of the communication device 1200 in FIG. 12.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for reflecting, refracting, and/or re-radiating may include the RIS 1212 and element 1214 of the communication device 1200 in FIG. 12.

In some examples, means for determining and/or performing may include various processing system components, such as: the one or more processors 1220 in FIG. 12, or aspects of the RIS controller 216 depicted in FIG. 2, including the interference cancellation component 218.

Notably, FIG. 12 is an example, and many other examples and configurations of communication device 1200 are possible.

Figure 13:
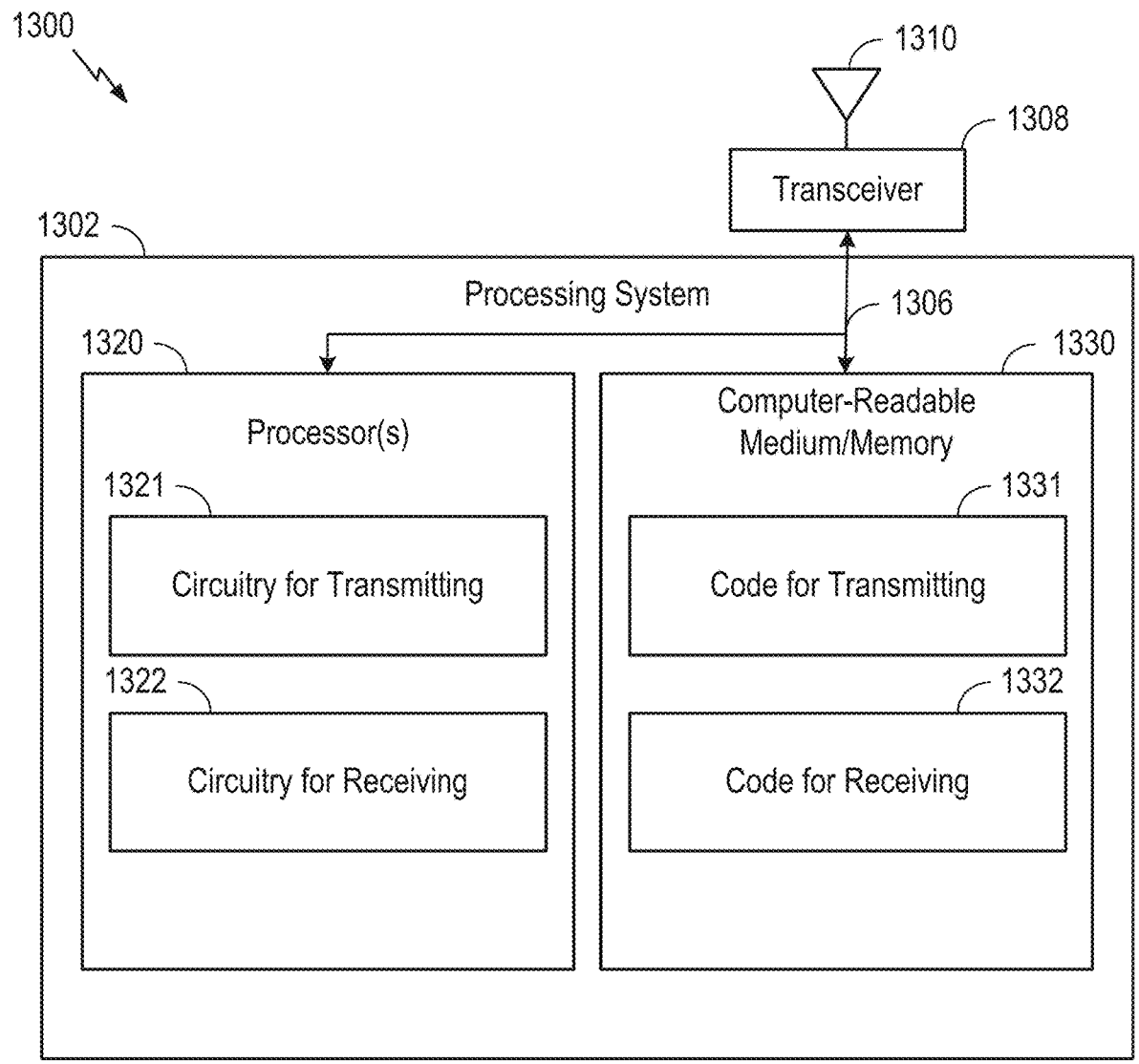
FIG. 13 depicts aspects of an example communications device.

FIG. 13 depicts an example communications device 1300 that includes various components operable, configured, or adapted to perform operations for the techniques disclosed herein, such as the operations depicted and described with respect to FIGS. 7-9 and 11. In some examples, communication device 1300 may be a user equipment 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 7-9 and 11, or other operations for performing the various techniques discussed herein for RIS-based interference cancellation.

In the depicted example, computer-readable medium/memory 1330 stores code 1331 for transmitting and/or code 1332 for receiving.

In the depicted example, the one or more processors 1320 include circuitry configured to implement the code stored in the computer-readable medium/memory 1330, including circuitry 1321 for transmitting and/or circuitry 1322 for receiving.

Various components of communications device 1300 may provide means for performing the methods described herein, including with respect to FIGS. 7-9 and 11.

In some examples, means for transmitting or sending (or means for outputting for transmission) may include the transceivers 254 and/or antenna(s) 252 of the user equipment 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the user equipment 104 illustrated in FIG. 2 and/or transceiver 1308 and antenna 1310 of the communication device 1300 in FIG. 13.

Notably, FIG. 13 is an example, and many other examples and configurations of communication device 1300 are possible.

Example Aspects

Implementation examples are described in the following numbered aspects:

Aspect 1: A network entity for wireless communication, comprising: a memory; and a processor coupled to the memory, the processor and the memory being configured to: determine to perform interference cancellation with a reconfigurable intelligent surface (RIS) for interference that will occur at a first wireless node based at least in part on one or more criteria, wherein the interference includes an interfering signal that will be transmitted by a second wireless node, and perform the interference cancellation with reflections from the RIS in response to the determination.

Aspect 2: The network entity of Aspect 1, wherein the one or more criteria includes at least one of: resource reservations that indicate the interfering signal will occur at the first wireless node; sensing information; one or more channel measurements; a request to perform the interference cancellation from at least one of the first wireless node or the second wireless node; a report, from at least one of the first wireless node or the second wireless node, including information related to the interference cancellation; a first distance between the network entity and the first wireless node; a second distance between the network entity and the second wireless node; a third distance between the network entity and a coverage area of the reflections; or a priority, service type, or range associated with transmissions from at least one of the first wireless node or the second wireless node.

Aspect 3: The network entity of Aspect 1 or 2, wherein the processor and the memory are further configured to: determine a coverage area of the reflections to provide the interference cancellation for a plurality of wireless nodes including the first wireless node; and perform the interference cancellation comprises forming the reflections, using the RIS, within the coverage area.

Aspect 4: The network entity according to any of Aspects 1-3, wherein the processor and the memory are further configured to transmit, to at least one of the first wireless node or the second wireless node, a notification that the network entity will perform the interference cancellation.

Aspect 5: The network entity of Aspect 4, wherein the notification includes at least one of: a first identifier associated with the first wireless node; a second identifier associated with the second wireless node; a zone identifier associated with a group of wireless nodes that will transmit the interfering signal; a first indication of when the interference cancellation will occur; or a second indication of whether feedback is expected from the first wireless node or the second wireless node.

Aspect 6: The network entity of Aspect 4 or 5, wherein the processor and the memory are further configured to: receive, from at least one of the first wireless node or the second wireless node, an indication of whether the interference cancellation is accepted or rejected; continue to perform the interference cancellation if the interference cancellation is accepted; and cease to perform the interference cancellation if the interference cancellation is rejected.

Aspect 7: The network entity according to any of Aspects 4-6, wherein the processor and the memory are further configured to: receive, from at least one of the first wireless node or the second wireless node, a request to adjust the interference cancellation; and adjust the interference cancellation based on the request.

Aspect 8: The network entity according to any of Aspects 1-7, wherein the processor and the memory are further configured to transmit, to at least one of the first wireless node or the second wireless node, a request for a report including information related to the interference cancellation.

Aspect 9: The network entity of Aspect 8, wherein the information includes at least one of: one or more channel measurements; retransmission information; collision information; or traffic information associated with transmissions from the second wireless node.

Aspect 10: The network entity of Aspect 8 or 9, wherein the processor and the memory are further configured to receive the report before performing the interference cancellation, wherein the one or more criteria includes the information.

Aspect 11: The network entity according to any of Aspects 8-10, wherein the processor and the memory are further configured to: receive the report periodically while performing the interference cancellation; and adjust the interference cancellation based at least in part on the report.

Aspect 12: The network entity according to any of Aspects 1-11, wherein the processor and the memory are further configured to receive, from at least one of the first wireless node or the second wireless node, a request to perform the interference cancellation, wherein the one or more criteria includes the request.

Aspect 13: The network entity of Aspect 12, wherein the request includes at least one of: an identifier associated with the first wireless node or the second wireless node; location information associated with a location of the interfering signal; or traffic information associated with the interfering signal.

Aspect 14: The network entity of Aspect 12 or 13, wherein the processor and the memory are further configured to transmit, to at least one of the first wireless node or the second wireless node, a notification that the network entity will perform the interference cancellation in response to the request.

Aspect 15: An apparatus for wireless communication, comprising: a memory; and a processor coupled to the memory, the processor and the memory being configured to: receive, from a network entity, a notification that a reconfigurable intelligent surface (RIS) will perform interference cancellation for interference that will occur at at least one of the apparatus or a wireless node, and transmit a report including information related to the interference cancellation in response to at least the notification.

Aspect 16: The apparatus of Aspect 15, wherein the notification includes at least one of: a first identifier associated with the apparatus; a second identifier associated with the wireless node; a zone identifier associated with a group of wireless nodes that will transmit the interference; a first indication of when the interference cancellation will occur; or a second indication of whether feedback is expected from the apparatus.

Aspect 17: The apparatus of Aspect 15 or 16, wherein the processor and the memory are further configured to transmit, to the network entity, an indication of whether the interference cancellation is accepted or rejected.

Aspect 18: The apparatus according to any of Aspects 15-17, wherein the processor and the memory are further configured to transmit, to the network entity, a request to adjust the interference cancellation.

Aspect 19: The apparatus according to any of Aspects 15-18, wherein the processor and the memory are further configured to receive, from the network entity, a request for a report including information related to the interference cancellation.

Aspect 20: The apparatus according to any of Aspects 15-19, wherein the information includes at least one of: one or more channel measurements; retransmission information; collision information; or traffic information associated with transmissions from the wireless node.

Aspect 21: The apparatus according to any of Aspects 15-20, wherein the processor and the memory are further configured to transmit the report before the interference cancellation is performed at the network entity.

Aspect 22: The apparatus according to any of Aspects 15-21, wherein the processor and the memory are further configured to transmit the report in response to criteria detected at the apparatus.

Aspect 23: The apparatus according to any of Aspects 15-22, wherein the processor and the memory are further configured to transmit the report periodically while the network entity performs the interference cancellation.

Aspect 24: The apparatus according to any of Aspects 15-23, wherein the processor and the memory are further configured to transmit, to the network entity, a request to perform the interference cancellation.

Aspect 25: The apparatus of Aspect 24, wherein the request includes at least one of: an identifier associated with the apparatus or the wireless node; location information associated with a location of the interference; or traffic information associated with the interference.

Aspect 26: The apparatus of Aspect 24 or 25, wherein the processor and the memory are further configured to receive the notification in response to the request.

Aspect 27: A method of wireless communication by a network entity, comprising: determining to perform interference cancellation with a reconfigurable intelligent surface (RIS) for interference that will occur at a first wireless node based at least in part on one or more criteria, wherein the interference includes an interfering signal that will be transmitted by a second wireless node; and performing the interference cancellation with reflections from the RIS in response to the determination.

Aspect 28: The method of Aspect 27, wherein the one or more criteria includes at least one of: resource reservations that indicate the interfering signal will occur at the first wireless node; sensing information; one or more channel measurements; a request to perform the interference cancellation from at least one of the first wireless node or the second wireless node; a report, from at least one of the first wireless node or the second wireless node, including information related to the interference cancellation; a first distance between the network entity and the first wireless node; a second distance between the network entity and the second wireless node; a third distance between the network entity and a coverage area of the reflections; or a priority, service type, or range associated with transmissions from at least one of the first wireless node or the second wireless node.

Aspect 29: The method of Aspect 27 or 28, wherein: determining to perform the interference cancellation comprises determining a coverage area of the reflections to provide the interference cancellation for a plurality of wireless nodes including the first wireless node; and performing the interference cancellation comprises forming the reflections, using the RIS, within the coverage area.

Aspect 30: The method according to any of Aspects 27-29, further comprising transmitting, to at least one of the first wireless node or the second wireless node, a notification that the network entity will perform the interference cancellation.

Aspect 31: The method of Aspect 30, wherein the notification includes at least one of: a first identifier associated with the first wireless node; a second identifier associated with the second wireless node; a zone identifier associated with a group of wireless nodes that will transmit the interfering signal; a first indication of when the interference cancellation will occur; or a second indication of whether feedback is expected from the first wireless node or the second wireless node.

Aspect 32: The method of Aspect 30 or 31, further comprising: receiving, from at least one of the first wireless node or the second wireless node, an indication of whether the interference cancellation is accepted or rejected; continuing to perform the interference cancellation if the interference cancellation is accepted; and ceasing to perform the interference cancellation if the interference cancellation is rejected.

Aspect 33: The method according to any of Aspects 30-32, further comprising: receiving, from at least one of the first wireless node or the second wireless node, a request to adjust the interference cancellation; and adjusting the interference cancellation based on the request.

Aspect 34: The method according to any of Aspects 27-33, further comprising transmitting, to at least one of the first wireless node or the second wireless node, a request for a report including information related to the interference cancellation.

Aspect 35: The method of Aspect 34, wherein the information includes at least one of: one or more channel measurements; retransmission information; collision information; or traffic information associated with the transmissions from the second wireless node.

Aspect 36: The method of Aspect 34 or 35, further comprising: receiving the report before performing the interference cancellation, wherein the one or more criteria includes the information.

Aspect 37: The method according to any of Aspects 34-36, further comprising: receiving the report periodically while performing the interference cancellation; and adjusting the interference cancellation based at least in part on the report.

Aspect 38: The method according to any of Aspects 27-37, further comprising receiving, from at least one of the first wireless node or the second wireless node, a request to perform the interference cancellation, wherein the one or more criteria includes the request.

Aspect 39: The method of Aspect 38, wherein the request includes at least one of: an identifier associated with the first wireless node or the second wireless node; location information associated with a location of the interfering signal; or traffic information associated with the interfering signal.

Aspect 40: The method of Aspect 38 or 39, further comprising transmitting, to at least one of the first wireless node or the second wireless node, a notification that the network entity will perform the interference cancellation in response to the request.

Aspect 41: A method of wireless communication by a first wireless node, comprising: receiving, from a network entity, a notification that a reconfigurable intelligent surface (RIS) will perform interference cancellation for interference that will occur at at least one of the first wireless node or a second wireless node; and transmitting a report including information related to the interference cancellation in response to at least the notification.

Aspect 42: The method of Aspect 41, wherein the notification includes at least one of: a first identifier associated with the first wireless node; a second identifier associated with the second wireless node; a zone identifier associated with a group of wireless nodes that will transmit the interference; a first indication of when the interference cancellation will occur; or a second indication of whether feedback is expected from the first wireless node.

Aspect 43: The method of Aspect 41 or 42, further comprising transmitting, to the network entity, an indication of whether the interference cancellation is accepted or rejected.

Aspect 44: The method according to any of Aspects 41-43, further comprising transmitting, to the network entity, a request to adjust the interference cancellation.

Aspect 45: The method according to any of Aspects 41-44, further comprising receiving, from the network entity, a request for a report including information related to the interference cancellation.

Aspect 46: The method according to any of Aspects 41-45, wherein the information includes at least one of: one or more channel measurements; retransmission information; collision information; or traffic information associated with transmissions from the second wireless node.

Aspect 47: The method according to any of Aspects 41-46, wherein transmitting the report comprises transmitting the report before the interference cancellation is performed at the network entity.

Aspect 48: The method according to any of Aspects 41-47, wherein transmitting the report comprises transmitting the report in response to criteria detected at the first wireless node.

Aspect 49: The method according to any of Aspects 41-48, wherein transmitting the report comprises transmitting the report periodically while the network entity performs the interference cancellation.

Aspect 50: The method according to any of Aspects 41-49, further comprising transmitting, to the network entity, a request to perform the interference cancellation.

Aspect 51: The method of Aspect 50, wherein the request includes at least one of: an identifier associated with the first wireless node or the second wireless node; location information associated with a location of the interference; or traffic information associated with the interference.

Aspect 52: The method of Aspect 50 or 51, wherein the notification is received in response to the request.

Aspect 53: An apparatus, comprising: a memory comprising executable instructions; one or more processors configured to execute the executable instructions and cause the apparatus to perform a method in accordance with any of Aspects 27-52.

Aspect 54: An apparatus, comprising means for performing a method in accordance with any of Aspects 27-52.

Aspect 55: A computer-readable medium comprising executable instructions that, when executed by one or more processors of an apparatus, cause the apparatus to perform a method in accordance with any of Aspects 27-52.

Aspect 56: A computer program product embodied on a computer-readable storage medium comprising code for performing a method in accordance with any of Aspects 27-52.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of RIS-based interference cancellation in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A network entity for wireless communication, comprising:
   one or more memory; and
   one or more processor coupled to the one or more memory, the one or more processor and the one or more memory being configured to:
   determine to perform interference cancellation with a reconfigurable intelligent surface (RIS) for interference that will occur at a first wireless node based at least in part on one or more criteria, wherein the interference includes an interfering signal that will be transmitted by a second wireless node, and
   perform the interference cancellation with reflections from the RIS in response to the determination.

2. The network entity of claim 1, wherein the one or more criteria includes at least one of:
   resource reservations that indicate the interfering signal will occur at the first wireless node;
   sensing information;
   one or more channel measurements;

a request to perform the interference cancellation from at least one of the first wireless node or the second wireless node;
a report, from at least one of the first wireless node or the second wireless node, including information related to the interference cancellation;
a first distance between the network entity and the first wireless node;
a second distance between the network entity and the second wireless node;
a third distance between the network entity and a coverage area of the reflections; or
a priority, service type, or range associated with transmissions from at least one of the first wireless node or the second wireless node.

3. The network entity of claim 1, wherein the one or more processor and the one or more memory are further configured to:
determine a coverage area of the reflections to provide the interference cancellation for a plurality of wireless nodes including the first wireless node; and
perform the interference cancellation comprises forming the reflections, using the RIS, within the coverage area.

4. The network entity of claim 1, wherein the one or more processor and the one or more memory are further configured to transmit, to at least one of the first wireless node or the second wireless node, a notification that the network entity will perform the interference cancellation.

5. The network entity of claim 4, wherein the notification includes at least one of:
a first identifier associated with the first wireless node;
a second identifier associated with the second wireless node;
a zone identifier associated with a group of wireless nodes that will transmit the interfering signal;
a first indication of when the interference cancellation will occur; or
a second indication of whether feedback is expected from the first wireless node or the second wireless node.

6. The network entity of claim 4, wherein the one or more processor and the one or more memory are further configured to:
receive, from at least one of the first wireless node or the second wireless node, an indication of whether the interference cancellation is accepted or rejected;
continue to perform the interference cancellation if the interference cancellation is accepted; and
cease to perform the interference cancellation if the interference cancellation is rejected.

7. The network entity of claim 4, wherein the one or more processor and the one or more memory are further configured to:
receive, from at least one of the first wireless node or the second wireless node, a request to adjust the interference cancellation; and
adjust the interference cancellation based on the request.

8. The network entity of claim 1, wherein the one or more processor and the one or more memory are further configured to transmit, to at least one of the first wireless node or the second wireless node, a request for a report including information related to the interference cancellation.

9. The network entity of claim 8, wherein the information includes at least one of:
one or more channel measurements;
retransmission information;
collision information; or
traffic information associated with transmissions from the second wireless node.

10. The network entity of claim 8, wherein the one or more processor and the one or more memory are further configured to receive the report before performing the interference cancellation, wherein the one or more criteria includes the information.

11. The network entity of claim 8, wherein the one or more processor and the one or more memory are further configured to:
receive the report periodically while performing the interference cancellation; and
adjust the interference cancellation based at least in part on the report.

12. The network entity of claim 1, wherein the one or more processor and the one or more memory are further configured to receive, from at least one of the first wireless node or the second wireless node, a request to perform the interference cancellation, wherein the one or more criteria includes the request.

13. The network entity of claim 12, wherein the request includes at least one of:
an identifier associated with the first wireless node or the second wireless node;
location information associated with a location of the interfering signal; or
traffic information associated with the interfering signal.

14. The network entity of claim 12, wherein the one or more processor and the one or more memory are further configured to transmit, to at least one of the first wireless node or the second wireless node, a notification that the network entity will perform the interference cancellation in response to the request.

15. A method of wireless communication by a network entity, comprising:
determining to perform interference cancellation with a reconfigurable intelligent surface (RIS) for interference that will occur at a first wireless node based at least in part on one or more criteria, wherein the interference includes an interfering signal will be transmitted by a second wireless node; and
performing the interference cancellation with reflections from the RIS in response to the determination.

16. The method of claim 15, wherein the one or more criteria includes at least one of:
resource reservations that indicate the interfering signal will occur at the first wireless node;
sensing information;
one or more channel measurements;
a request to perform the interference cancellation from at least one of the first wireless node or the second wireless node;
a report, from at least one of the first wireless node or the second wireless node, including information related to the interference cancellation;
a first distance between the network entity and the first wireless node;
a second distance between the network entity and the second wireless node;
a third distance between the network entity and a coverage area of the reflections; or
a priority, service type, or range associated with transmissions from at least one of the first wireless node or the second wireless node.

17. The method of claim 15, further comprising transmitting, to at least one of the first wireless node or the second wireless node, a notification that the network entity will perform the interference cancellation.

\* \* \* \* \*